United States Patent
Maron et al.

(10) Patent No.: US 6,768,825 B2
(45) Date of Patent: Jul. 27, 2004

(54) OPTICAL SENSOR DEVICE HAVING CREEP-RESISTANT OPTICAL FIBER ATTACHMENTS

(75) Inventors: Robert J. Maron, Middletown, CT (US); Guy A. Daigle, Plainville, CT (US); James R. Dunphy, South Glastonbury, CT (US); Thomas W. Engel, East Hampton, CT (US); John J. Grunbeck, Northford, CT (US); Mark R. Fernald, Enfield, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 190 days.

(21) Appl. No.: 09/873,978

(22) Filed: Jun. 1, 2001

(65) Prior Publication Data

US 2002/0009252 A1 Jan. 24, 2002

Related U.S. Application Data

(63) Continuation-in-part of application No. 09/073,701, filed on May 6, 1998, now Pat. No. 6,317,555.

(30) Foreign Application Priority Data

| Nov. 12, 1999 | (JP) | ............................................. 9-322434 |
| Nov. 12, 1999 | (JP) | ............................................. 9-322435 |
| Sep. 8, 2000 | (JP) | ....................................... 2000-27907 |
| Sep. 8, 2000 | (JP) | ....................................... 2000-27908 |

(51) Int. Cl.⁷ ............................. G02B 6/00; G02B 6/34
(52) U.S. Cl. .......................................... 385/13; 385/37
(58) Field of Search ............................. 385/12, 13, 37, 385/136, 137; 73/705; 250/227.14, 227.18

(56) References Cited

U.S. PATENT DOCUMENTS

| 4,163,370 A | 8/1979 | Kurth ............................. 65/2 |
| 4,725,110 A | 2/1988 | Glenn et al. |

(List continued on next page.)

FOREIGN PATENT DOCUMENTS

| EP | 0316473 | 5/1989 | |
| EP | 0487151 | 5/1992 | |
| EP | 0736784 | 10/1996 | |
| JP | 55-43524 A | * 3/1980 | .................. 385/80 |
| JP | 60-60608 A | * 4/1985 | .................. 385/78 |
| WO | 9107355 | 5/1991 | |
| WO | 9626458 | 8/1996 | |
| WO | 9913307 | 3/1999 | ............. G01L/9/00 |
| WO | 9944026 | 9/1999 | |
| WO | 9957589 | 11/1999 | |

OTHER PUBLICATIONS

U.S. patent application Ser. No. 09/699,940, Sullivan et al., filed Oct. 30, 2000.

*Primary Examiner*—Akm Enayet Ullah
*Assistant Examiner*—Mike Stahl
(74) *Attorney, Agent, or Firm*—Moser, Patterson & Sheridan, L.L.P.

(57) ABSTRACT

A method and device for pressure sensing using an optical fiber having a core, a cladding and a Bragg grating imparted in the core for at least partially reflecting an optical signal at a characteristic wavelength. The cladding has two variation regions located on opposite sides of the Bragg grating to allow attachment mechanisms to be disposed against the optical fiber. The attachment mechanisms are mounted to a pressure sensitive structure so as to allow the characteristic wavelength to change according to pressure in an environment. In particular, the variation region has a diameter different from the cladding diameter, and the attachment mechanism comprises a ferrule including a front portion having a profile substantially corresponding to at least a portion of the diameter of the variation region and a butting mechanism which holds the ferrule against the optical fiber.

89 Claims, 15 Drawing Sheets

U.S. PATENT DOCUMENTS

| | | | |
|---|---|---|---|
| 4,746,185 A | 5/1988 | Shahidi-Hamedani | |
| 4,772,085 A | 9/1988 | Moore et al. | |
| 4,807,950 A | 2/1989 | Glenn et al. | |
| 4,915,467 A | 4/1990 | Berkey | |
| 4,932,262 A * | 6/1990 | Wlodarczyk | 73/705 |
| 5,321,790 A | 6/1994 | Takahashi et al. | 385/140 |
| 5,388,173 A | 2/1995 | Glenn | 385/37 |
| 5,461,926 A | 10/1995 | Bobb et al. | 73/800 |
| 5,511,083 A | 4/1996 | D'Amato et al. | 372/6 |
| 5,512,078 A | 4/1996 | Griffin | 65/484 |
| 5,513,913 A | 5/1996 | Ball et al. | 374/120 |
| 5,564,832 A | 10/1996 | Ball et al. | 374/161 |
| 5,578,106 A | 11/1996 | Fleming, Jr. et al. | 65/391 |
| 5,666,372 A | 9/1997 | Ball et al. | 372/6 |
| 5,699,377 A | 12/1997 | Pan | 372/92 |
| 5,745,626 A | 4/1998 | Duck et al. | 385/96 |
| 5,771,251 A | 6/1998 | Kringlebotn et al. | 372/6 |
| 6,016,702 A | 1/2000 | Maron | 73/705 |
| 6,317,555 B1 * | 11/2001 | Maron et al. | 385/137 |
| 6,466,716 B1 * | 10/2002 | Ogle | 385/37 |
| 6,507,693 B2 * | 1/2003 | Maron et al. | 385/137 |
| 6,563,970 B1 * | 5/2003 | Bohnert et al. | 385/13 |

OTHER PUBLICATIONS

"Design of DFB Fibre Lasers", V.C. Lauridsen et al., Electronics Letters, Oct. 15, 1998, vol. 34, No. 21, pp 2028–2030.

"Erbium Doped Fiber DFB Laser With Permanent n/2 Phase–Shift Induced by UV Post–Processing", IOOC'95, Tech. Digest, vol. 5, PD1–3, 1995.

* cited by examiner

OPTICAL SENSOR DEVICE HAVING CREEP-RESISTANT OPTICAL FIBER ATTACHMENTS

CROSS REFERENCES TO RELATED APPLICATIONS

This is a Continuation-In-Part application of U.S. patent application Ser. No. 09/073,701 entitled "Creep-Resistant Optical Fiber Attachment", filed May 6, 1998, now U.S. Pat. No. 6,317,555, which is related to and filed on even date with U.S. patent application Ser. No. 09/073, 700 entitled "Optical Fiber Bulge", which is now abandoned, and U.S. patent application Ser. No. 09/073,699, entitled "Optical Fiber Outer Dimension Variation", which is also abandoned. U.S. patent application Ser. No. 09/073,701 has been published under the Patent Cooperation Treaty (PCT) on Nov. 11, 1999 as International Publication No. WO 99/57589. This CiDRA patent application is also related to patent application Ser. No. 09/872,855, now U.S. Pat. No. 6,507, 693, assigned to the assignee of the present invention and filed on even date herewith.

TECHNICAL FIELD

This invention relates to optical pressure sensing and, more particularly, to optical pressure sensing based on Bragg gratings imparted in an optical fiber.

BACKGROUND ART

In the extraction of oil from earth borehole, the naturally existing pressure within an earth formation is often used as the driving force for oil extraction. The oil may be extracted from a single location or from multiple locations within the well. In either case, it is desirable to know the fluid pressure with the well at one or more locations to aid the well operator in maximizing the depletion of the oil within the earth formation.

It is known to install pressure and temperature sensors with some electrical submersible pumps (ESPs) to provide the operator on the surface with information about the pump's performance. It is also known to use optical sensors for the measurement of wellbore conditions such as downhole wellbore pressures and temperatures. FIG. 1 illustrates such an environment. As shown in FIG. 1, the pressure sensor can be mounted to the casing of an electrically submersible pump. A light source in an optical module is used to feed optical signals to the pressure sensor through the optical fiber assembly. The signal indicative of the pressure at the sensing location provided by the pressure sensor is conveyed back to the optical module for processing. For pressure sensing at multiple locations within the wellbore, multiple pressure sensors may be serially multiplexed for distributed pressure sensing using wavelength division multiplexing (WDM) and/or time division multiplexing (TDM) techniques.

Sensors for the measurement of various physical parameters such as pressure and temperature often rely on the transmission of strain from an elastic structure (e.g., a diaphragm, bellows, etc.) to a sensing element. In a pressure sensor, the sensing element may be bonded to the elastic structure with a suitable adhesive.

It is also known that the attachment of the sensing element to the elastic structure can be a large source of error if the attachment is not highly stable. In the case of sensors, which measure static or very slowly changing parameters, the long-term stability of the attachment to the structure is extremely important. A major source of such long term sensor instability is a phenomenon known as "creep", i.e., change in strain on the sensing element with no change in applied load on the elastic structure, which results in a DC shift or drift error in the sensor signal.

Certain types of fiber optic sensors for measuring static and/or quasi-static parameters require a highly stable, very low creep attachment of the optical fiber to the elastic structure. One example of a fiber optic based sensor is that described in U.S. Pat. No. 6,016,702 entitled "High Sensitivity Fiber Optic Pressure Sensor for Use in Harsh Environments", issued to Robert J. Maron, which is incorporated herein by reference in its entirety. In that case, an optical fiber is attached in tension to a compressible bellows at one location along the fiber and to a rigid structure (or housing) at a second location along the fiber with a Bragg grating embedded within the fiber between these two fiber attachment locations. As the bellows is compressed due to an external pressure change, the strain on the fiber grating changes, which changes the wavelength of light reflected by the grating. If the attachment of the fiber to the structure is not stable, the fiber may move (or creep) relative to the structure it is attached to, and the aforementioned measurement inaccuracies occur.

One common technique for attaching the optical fiber to a structure is epoxy adhesives. It is common to restrict the use of epoxy adhesives to temperatures below the glass transition temperature of the epoxy. Above the glass transition temperature, the epoxy transitions to a soft state in which creep becomes significant and, thus, the epoxy becomes unusable for attachment of a sensing element in a precision transducer. Also, even below the glass transition temperature significant creep may occur.

Another technique is to solder the structure to a metal-coated fiber. However, it is known that solders are susceptible to creep under certain conditions. In particular, some soft solders, such as common lead-tin (PbSn) solder, have a relatively low melting point temperature and are thus relatively unsuitable for use in transducers that are used at elevated temperatures and/or at high levels of stress in the solder attachment. The use of "hard" solders with higher melting temperatures, such as gold-germanium (AuGe) and gold-silicon (AuSi), can reduce the problem; however, at elevated temperatures and/or high stress at the solder attachment, these hard solders also exhibit creep. In addition, the high melting temperature of such solders may damage the metal coating and/or damage the bond between the metal coating and glass fiber.

It is advantageous and desirable to provide a reliable method and system for accurately measuring the pressure at one or more locations in an environment, wherein the pressure sensor is comprised of a mechanism to prevent long term sensor instability due to changes in strain on the sensing elements.

SUMMARY OF THE INVENTION

The first aspect of the present invention is a pressure sensor, responsive to an optical signal, for providing a sensor signal indicative of pressure in an environment. The pressure sensor comprises an optical waveguide having a longitudinal axis, a first mounting location and a second mounting location separated by a separation distance along the longitudinal axis which propagates the optical sensor signal, wherein the waveguide comprises a core and a cladding disposed outside the core, and wherein the cladding has an outside diameter and includes a first and a second variation region each having a modified outside diameter different from the outside diameter, wherein the first and second variation regions are respectively located at the first mounting location and the second mounting location, wherein a Bragg grating is imparted in the waveguide between the first mounting location and the second mounting location which provides the optical sensor signal having a spectral profile centered at a characteristic wavelength along said waveguide, wherein a first attachment mechanism is disposed against at least one portion of the first variation region which prevents relative movement between the first variation region and the first attachment mechanism, wherein a second attachment mechanism is disposed against at least one portion of the second variation region which prevents relative movement between the second variation region and the second attachment mechanism, and wherein a mounting device has a first end which mounts to the first attachment mechanism and a second end which mounts to the second attachment mechanism which defines a separation length between the first and second attachment mechanisms along the longitudinal axis of the waveguide and allowing the separation length to vary according to the pressure of the environment, thereby causing a change in the separation and the characteristic wavelength.

According to the present invention, the first attachment mechanism comprises a first ferrule including a front portion having a profile substantially corresponding to the modified outside diameter of the first variation region of the cladding, and a first butting mechanism butting the first ferrule against the waveguide which presses the front portion of the first ferrule onto at least one portion of the first variation region at the first mounting location and which limits relative movement between the first ferrule and the first variation region of the cladding, wherein the second attachment mechanism comprises a second ferrule including a front portion having a profile substantially corresponding to the modified outside diameter of the second variation region of the cladding, and wherein a second butting mechanism butts the second ferrule against the waveguide to press the front portion of the second ferrule onto at least one portion of the second variation region at the second mounting location which limits relative movement between the second ferrule and the second variation region of the cladding.

According to the present invention, the mounting device comprises a bellows structure which mounts to the first and second attachment mechanisms at the first and second ends of the mounting device.

In order to isolate the temperature effect on the pressure sensor, a temperature compensation means is used to provide a temperature compensation optical signal.

According to the present invention, the first and second variation regions include expanded regions in the cladding such that the modified outside diameter is greater than the outside diameter of the cladding and the first and second variation regions include recessed regions in the cladding such that the modified outside diameter is smaller than the outside diameter of the cladding.

According to the present invention, a buffer layer may be provided over the cladding which protects the waveguide against the first and second attachment mechanisms and which enhances the attachment of the first and second attachment mechanisms to the waveguide.

According to the present invention, the first and second ferrules comprise a plurality of pieces substantially surrounding the respective variation regions which attach to the cladding.

According to the present invention, it is possible to splice a waveguide segment having a cladding of a different diameter to the waveguide in order to form a variation region. Alternatively, a tube can be fused to the cladding to change the outside diameter of the cladding.

According to the present invention, the waveguide is either held in tension or compression by the attachment mechanisms.

According to the present invention, the waveguide can be heated and stretched, or etched to modify the outside diameter of the cladding.

According to the present invention, the optical waveguide is an optical fiber.

The second aspect of the present invention is a method of sensing pressure in an environment with an optical signal. The method comprises the steps of providing an optical waveguide having a longitudinal axis which propagates the optical signal and provides a sensor signal indicative of the pressure in the environment in response to the optical signal, wherein the waveguide has a first mounting location and a second mounting location separated by a separation distance along the longitudinal axis, and wherein the waveguide comprises a core and a cladding disposed outside the core, wherein the cladding has an outside diameter and includes a first and a second variation region each having a modified outside diameter different from the outside diameter, and wherein the first and second variation regions are respectively located at the first mounting location and the second mounting location, providing a grating imparted in the core of the waveguide between the first mounting location and the second mounting location which provides the optical sensor signal having a spectral profile centered at a characteristic wavelength along said waveguide, providing a first attachment mechanism disposed against at least one portion of the first variation region, which prevents relative movement between the first variation region and the first attachment mechanism, providing a second attachment mechanism disposed against at least one portion of the second variation region, which prevents relative movement between the second variation region and the second attached mechanism, and providing a mounting device having a first end, which mounts to the first attachment mechanism and a second end, which mounts to the second attachment mechanism, which defines a separation length between the first and second attachment mechanisms along the longitudinal axis of the waveguide and allowing the separation length to vary according to the pressure of the environment, thereby causing a change in the separation distance between the first and second variation regions and the spacing of the grating.

According to the present invention, the method further comprises the step of providing a temperature compensation means responsive to temperature of the environment which provides a temperature compensation optical signal.

According to the present invention, the method further comprises the step of providing a coating between the cladding and the first and second ferrules which helps the ferrules to conform with the outside diameter of the respective variation regions and reduces point contact stresses on the waveguide.

According to the present invention, the method further comprises the step of providing buffer layer over the cladding to protect the waveguide against the first and second attachment mechanisms and for enhancing attachment of the first and second attachment mechanisms to the waveguide.

According to the present invention, the method further comprises the step of bonding the buffer layer to the first and second attachment mechanisms.

According to the present invention, the method further comprises the step of splicing a further waveguide segment including a cladding having a second outside diameter substantially equal to the modified outside diameter with the waveguide to form each of the first and second variation regions.

According to the present invention, the method further comprises the step of heating and stretching the waveguide to form the modified outside diameter of the first and second variation regions.

The present invention provides a significant improvement over the prior art by combining an optical fiber having an expanded and/or recessed outer dimension variation region, with a structure, such as a ferrule or housing, having a size and shape such that the structure mechanically locks against at least a portion of the variation region, thereby allowing the structure to attach to the fiber with minimal relative movement (or creep) in at least one predetermined direction between the fiber and the structure. The variation region and the structure may have various different shapes and sizes. However, while the geometry of the variation region is created from the optical fiber, low optical loss of the light being transmitted through the core of the fiber is maintained. There may also be a buffer layer between the cladding and the ferrule to protect the fiber and/or to help secure the structure to the fiber to minimize creep. Adhesives, such as solders, brazes, epoxies, etc., may also be used between the structure and the variation region.

The foregoing and other objects, features and advantages of the present invention will become more apparent in light of the following detailed description of exemplary embodiments thereof.

BEST MODE FOR CARRYING OUT THE INVENTION

Figure 2:
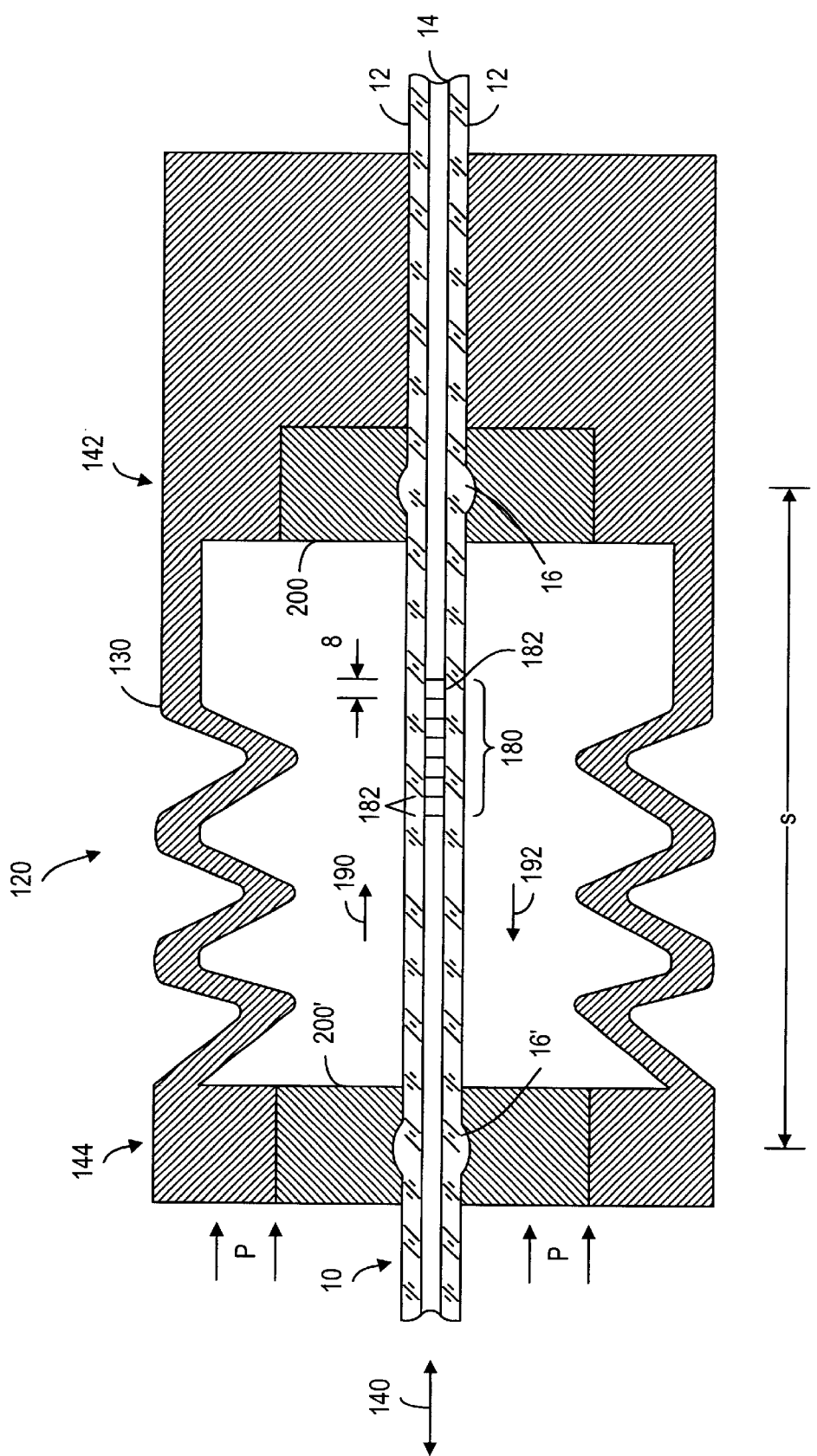
FIG. 2 is a side view cross-section of a pressure sensor, according to the present invention.

Referring to FIG. 2, a pressure sensor 120 comprises a single-mode optical waveguide or optical fiber 10 having a core 14 and a cladding 12. The cladding 12 has a plurality of variation regions 16, 16' and a Bragg grating 180 imparted in the core 14 between the variation regions 16, 16'. A first attachment mechanism 200 is disposed against the optical fiber 10 at a first mounting location 142, and a second attachment mechanism 200' is disposed against the optical fiber 10 at a second mounting location 144. The attachment mechanisms 200, 200' are fixedly mounted on a pressure sensing device, such as a multi-element bellows structure 130 to sense the pressure P along the longitudinal axis 140 of the optical fiber 10. The Bragg grating 180 has a plurality of "fringes" 182 formed from perturbations in the refractive index of the core 14. These perturbations are defined by spacing λ for at least partially reflecting an optical signal 190 transmitted in the optical fiber 10. The reflected signal is denoted by reference numeral 192. Bragg gratings are well known. A Bragg grating is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention. The grating 180 may be in the core 14 and/or in the cladding 12. Any wavelength-tunable grating or reflective element embedded, etched, imprinted, or otherwise formed in the waveguide 10 may be used if desired. The waveguide 10 may be photosensitive if a grating 180 is to be written into the waveguide 10. As used herein, the term "grating" means any of such reflective elements. Further, the reflective element (or grating) 180 may be used in reflection and/or transmission of light. Light 140 incident on the grating 180 reflects a portion thereof having a predetermined wavelength band of light, and passes the remaining wavelengths of the incident light as is known. The Bragg grating 180, when used in the pressure sensor 120, according to the present invention, is used to selectively reflect a particular frequency or wavelength of light that is propagated along the core 14. The particular wavelength of light reflected by the Bragg grating 180 is uniquely determined by the grating spacing $\lambda$ as is known and is referred to as the Bragg, or reflection, or characteristic wavelength. A broadband, or a scanned narrow band, light source is used to provide the optical signal 190, or other types of sources may be used, provided that the source has wavelengths that reflect off the desired gratings in the sensors. As shown in FIG. 2, the distance between the first mounting location 142 and the second mounting location 144 is denoted by S, which is subject to change according to the pressure P. If the fiber 10 between locations 142, 144 is held in tension, when the distance S decreases, the tension (or tensile strain) on the fiber 10 and the grating 180, decreases and the characteristic wavelength of the grating changes accordingly. It should be understood that the amount of distance change may be very small, e.g. picometers or nanometers. When a distributed pressure sensing system having a plurality of pressure sensors is used to measure pressure at a plurality of locations, the wavelength of the Bragg grating at each location may be different from the spacing for the Bragg grating at other locations. In this respect, the distributed pressure sensing system is effectively operated in a wavelength division multiplexing fashion. Pressure sensing using Bragg gratings at one or more locations is well known, as described in the aforementioned U.S. Pat. No. 6,016,702 entitled "High Sensitivity Fiber Optic Pressure Sensor for Use in Harsh Environments", issued to Robert J. Maron, referenced earlier. The main object of the present invention is to make pressure sensors more reliable by providing a method and system for firmly attaching the optical fiber 10 to a pressure sensitive structure so that the changes in the spacing $\lambda$ of the Bragg grating are accurately indicative of the changes in the pressure P. In particular, according to the present invention, at each sensing location, two attachment mechanisms 200, 200' are attached to the optical fiber 10 at two mounting locations 142, 144. At each of the mounting locations, a variation region 16, 16' of the cladding 14 is provided so that the attachment mechanism can be firmly disposed against the cladding 14. In general, the outside diameter of cladding at the variation region 16, 16' is different from the outside diameter of cladding in other parts of the optical fiber 10. The variation region can be an expanded region or a recessed region and have various shapes. The object is to prevent relative movement between the attachment mechanism and the optical fiber at the mounting location. FIGS. 3 to 10 illustrate various embodiments of the attachment mechanism, according to the present invention.

Figure 3:
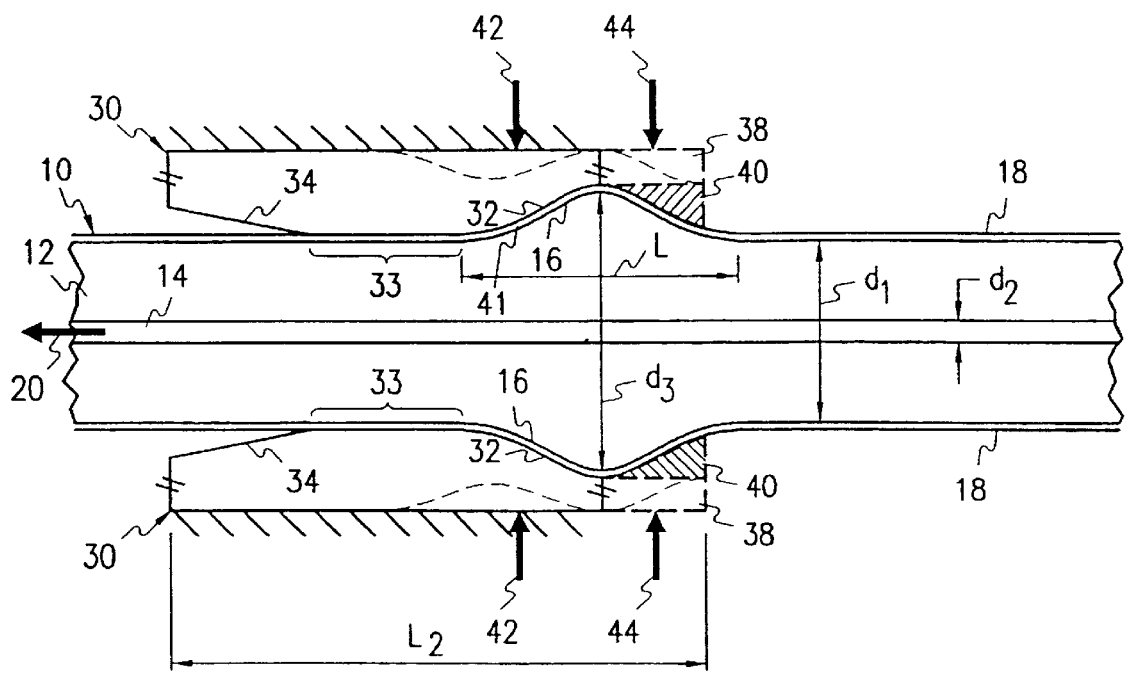
FIG. 3 is a side view cross-section of an optical fiber with an increased diameter region and an attachment mechanism engaged therewith, in accordance with the present invention.

Referring to FIG. 3, the cladding 12 of the optical fiber 10 has an outer diameter d1 of about 125 microns and the core 14 has a diameter d2 of approximately 7–10 microns (e.g., 9 microns). The fiber 10 is designed to propagate light along the core 14 of the fiber 10. The cladding 12 and the core 14 are made of fused silica glass or doped silica glasses. Other materials for the optical fiber or waveguide may be used if desired. The fiber 10 has a region 16 with an expanded (or increased) outer diameter (or dimension). The expanded region 16 has a length L of about 500 microns, and an outer diameter d3 of about 200 microns. Other dimensions of the cladding 12, core 14, and expanded region 16 may be used if desired, provided the diameter d3 of the expanded region 16 is greater than the diameter d1. Also, the fiber 10 may have an outer coating or buffer layer 18 used to protect the fiber and/or enhance attachment to the fiber (discussed more hereinafter).

The region 16 may be made by any technique for making a variation region in an outer dimension of a waveguide. Some techniques for making the region 16 are described in conjunction with FIGS. 11–14 below. A device for creating an expanded region 16 is described in conjunction with FIGS. 15 and 16. The region 16 allows the fiber 10 to be attached to a structure in many different ways, as described hereinafter with FIGS. 3–10.

In particular, referring to FIG. 3, a ferrule 30 (or sleeve) may be butted (or mated) against at least a portion of the expanded region 16 to provide a mechanical stop (or lock), which substantially prevents the fiber 10 from moving to the left relative to the ferrule 30, as indicated by a line 20 (i.e., the direction of an applied load on the fiber 10). The ferrule 30 may have a generally cylindrical and/or conical shape, or other shapes as discussed more hereinafter. The ferrule 30 may also overlap all or a portion of the expanded region 16. It is not required for the ferrule 30 to overlap the expanded region 16; however, overlap reduces point contact stresses on the fiber/expanded region, to reduce the possibility of cracking the glass of the fiber 10 and/or the expanded region 16, particularly when the expanded region 16 has a curved geometry.

Referring again to FIG. 3, the ferrule 30 has a front region 32 with a geometry (shape, contour, or profile) that substantially corresponds to the geometry of the expanded region. The shape of the region 32 need not exactly match that of the expanded region 16, and may be a straight taper or bevel instead of a curved surface. Also, the ferrule 30 may have a beveled section 34 to provide some stress relief on the fiber when the fiber 10 flexes or is pulled off-axis from the ferrule 30. Instead of the taper 34, the ferrule 30 may be terminated with a sharp perpendicular edge, if so desired.

The ferrule 30 may be butted directly against the expanded region 16 or may be bonded to the fiber 10 and/or the expanded region 16 with an adhesive material discussed hereinafter. The ferrule 30 may be preformed such that the shape of the front region 32 substantially conforms to the geometry of the expanded region 16. However, if the shape of the ferrule 30 does not match that of the expanded region 16, a material, e.g., an adhesive, a coating and/or a filler (discussed more hereinafter), may be used to fill any gaps therebetween to reduce point contact stresses on the fiber/expanded region and/or to provide bonding therebetween.

Alternatively, the ferrule 30 may be heated and/or pressure (or force) applied to the ferrule 30, e.g., by atmospheric (such as pressure and/or vacuum), mechanical (such as crimping), and/or magnetic techniques (such as electromagnetic forming), or any other technique, as indicated by arrows 42, to cause the ferrule 30 to match at least a portion of the geometry of the expanded region 16. For a glass ferrule, the ferrule 30 may be heated to a temperature at or below the softening temperature of the glass. For a metal ferrule, the ferrule may be heated to a temperature where the metal can be shaped. Alternatively, the ferrule 30 may be heated, held in place, and the fiber 10 pulled longitudinally toward and into contact with the ferrule 30 to force the ferrule 30 to conform to the shape of the variation region 16. This is particularly useful when the ferrule 30 is made of a metal, which has a much lower softening temperature than the glass, but may be used for any ferrule material.

Alternatively, the ferrule 30 may have a section 38, which extends to the right of and overhangs the right side of the expanded region 16. In that case, the region 40 between the inside of the ferrule 30 and the right side of the expanded region 16 may be partially or completely filled with an adhesive, e.g., solder, braze, epoxy, etc., similar to those discussed hereinafter. The adhesive may also fill any gaps on the left side of the region 16 along the region 32. In that case, to help minimize creep, the adhesive should be localized to the fiber variation region 16, and, thus, avoiding putting the adhesive in a region 33 will help avoid creep in the region 33. Instead of filling the region 40 with an adhesive, the section 38 may be heated and/or pressure (or force) applied to the section 38 (using any of the techniques discussed hereinbefore with the arrows 42), as indicated by arrows 44, to force the ferrule section 38 to conform to at least a portion of the right side of the expanded region 16. Also, such heating and/or applying of pressure (or force) may be performed on the regions 32, 38 together, e.g., with a single crimping tool, coining tool, or the like.

The ferrule 30 may be made of a ceramic/glass (e.g., sapphire, ruby, fused quartz, fused silica, etc.), a metal (e.g., Invar (64%Fe, 36%Ni alloy), or Kovar (54%Fe, 29 Ni, 17%Co)), or other low thermal expansion materials. The thermal expansion coefficient of the ferrule 30 should be close to that of the optical fiber 10 so that the geometry of the ferrule 30 and the expanded region 16 and/or the fiber 10 will substantially track each other over temperature to minimize creep and point contact stresses. If the optical fiber comprises silica glass (and thus has a low thermal expansion), a low thermal expansion material is desirable for the ferrule 30. Other optical fiber or waveguide materials may be used if desired, with the material for ferrule 30 being selected to have a substantially similar thermal expansion coefficient.

For any of the embodiments described herein, the ferrule 30 may be bonded to the fiber 10 and/or expanded region 16 using epoxy, metal solders, metal brazes, glass solders, ceramic adhesives, or other adhesive materials depending on the ferrule material, the fiber material, and whether or not there is the outer buffer layer (or coating) 18 on the cladding 12 of the fiber 10. Alternatively, as discussed hereinbefore, the ferrule may be butted-up against the region 16 without any adhesives.

Also, the buffer layer 18 (if used) may be made of various materials, e.g., metal, polymer, teflon, and/or carbon, or other materials, and may comprise a plurality of layers. The buffer layer 18 may be used to protect the fiber, and/or enhance attachment of the ferrule 30 to the fiber (e.g., reduce creep). The buffer layer 18 may comprise a metal layer (or metalized coating) made of a material that is rigid enough to protect the outer surface of the fiber to help prevent fiber breakage at or near the region 16. The metal layer may also be a material that is malleable (i.e., a material that deforms plastically under a compressive load) that can sustain local compressive loads and exhibits high plastic strain without material failure (e.g., tearing, forming voids, etc.), which helps the ferrule 30 conform to the geometry of the region 16. Some such malleable metals include gold, platinum, nickel, etc. Also, the metal layer may be used to promote glass surface wetting for solders.

For example, the buffer layer 18 may be made of nickel-gold (NiAu), having a thickness of about 1–3 microns Ni on the fiber and about 70–150 nanometers Au on the nickel, or thicker Au, e.g., about 1–10 microns, may be used. Such a buffer layer 18 may be used with metal solder to solder the ferrule 30 to the layer 18, or may be used without any solder (where the ferrule is butted-up against the region 16). Other metals and thickness may be used for the metal layer.

Alternatively, the buffer layer 18 may comprise a layer of polymer (e.g., high temperature polyimide) having a thickness of about 1–10 microns over the metal layer or directly on the cladding 12 without the metal layer. Other types of polymers and thickness may be used. When a polymer is used, it may be necessary to heat the combined fiber/variation/ferrule to an elevated temperature (e.g., at or above the operating temperature for the application) for a settling time, to allow the polymer to reach a steady state condition, e.g., thickness, shape, displacement, etc. and thus exhibit minimal creep. Other thicknesses, a number of layers, materials and compositions of the layers of the buffer layer 18 may be used.

Also the ferrule 30 may have an inner diameter coating 41 of one or more of the aforementioned malleable material(s), to help the ferrule 30 to conform to the geometry of the expanded region 16, thereby reducing point contact stresses on the fiber, and/or to enhance bonding to the buffer layer 18 or to the fiber 10. Such an inner coating on the ferrule 30 may be used whether or not the buffer layer 18 on the fiber 10 is used, and whether or not the ferrule 30 is soldered to the fiber 10 or the expanded region 16. Also, the inner diameter of the ferrule 10 may be polished to reduce stress concentrations.

The ferrule 30 may be a one-piece ferrule, or a semicircular two or more piece ferrule. Using a multi-piece ferrule provides the advantage of not having to slide the ferrule 30 along the fiber 10 to the region 16, thereby reducing the possibility of scratching or causing other damage to the outer surface of the fiber 10 (with or without the buffer coating 18) and allowing the buffer layer 18 away from the region 16 to be thicker and/or non-uniform.

Figure 4:
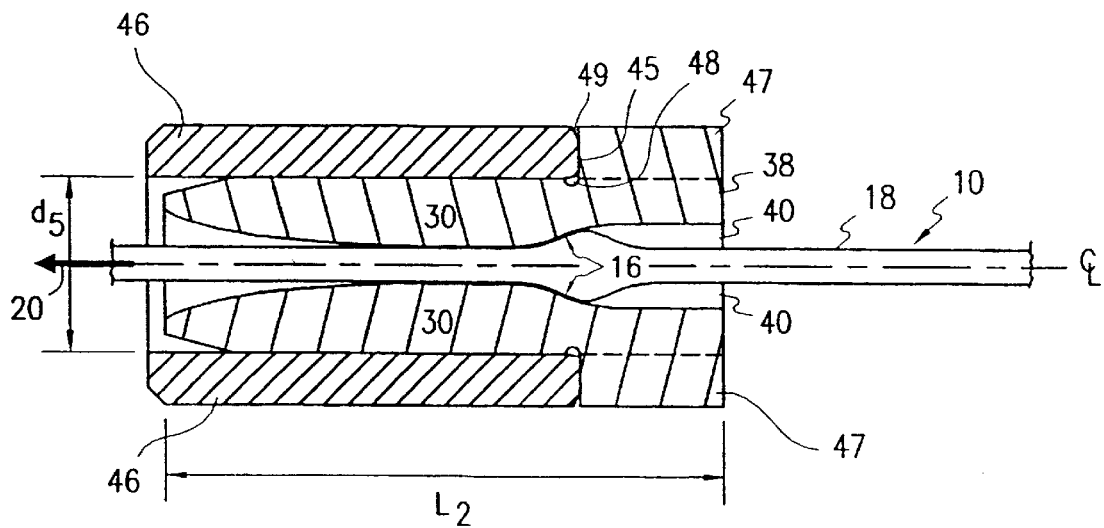
FIG. 4 is a side view cross-section of an optical fiber with an increased diameter region and another attachment mechanism engaged therewith, in accordance with the present invention.

Referring to FIG. 4, in an alternative design of the ferrule 30, the section 38 extends to the right of and overhangs the right side of the expanded region 16 and some of the fiber 10. If the ferrule 30 is a multi-piece ferrule, to hold such a ferrule together (around the fiber 10 and/or the region 16), the ferrule 30 may be self-locking, may be hinged (like a clamshell), and/or a collar 46 may be used. The collar 46 may have a substantially straight inner diameter d5, of, e.g., 0.022 inches, which substantially matches or is slightly less than the outer diameter of the ferrule 30 to provide a contacting or frictional fit between the collar 46 and the ferrule 30. Other ferrule and collar diameters or dimensions may be used if desired. Also the ferrule 30 may have an enlarged region 47 to provide a stop for the collar 46 or for other purposes. Further, the ferrule 30 may have a recessed region 48 to allow for the collar 46 and ferrule 30 to mate flush at a face 45. Also, a slight bevel 49 may be provided on the collar 46 or the ferrule 30 to allow a tool, e.g., a razor blade, to be inserted to separate the collar 46 from the ferrule 30. The collar 46 may be made of the same material as the ferrule 30, or a material with substantially the same thermal expansion coefficient. Alternatively, the collar 46 may be made of heat shrinking materials such as metals, polymers, or shape memory alloys. To facilitate assembly of the multi-piece ferrule 30 onto the fiber 10, the multi-piece ferrule 30 may be placed into the collar 46 and then slid along the fiber 10 to the region 16. Then, heating and/or applying pressure (or force) to the collar 46 (such as discussed hereinbefore with FIG. 3 with the ferrule 30) will cause at least a portion of the ferrule 30 to lock onto at least a portion of the region 16.

The length L2 of the ferrule 30 is about 0.075 inches. Other longer or shorter lengths may be used for the ferrule 30.

Figure 5:
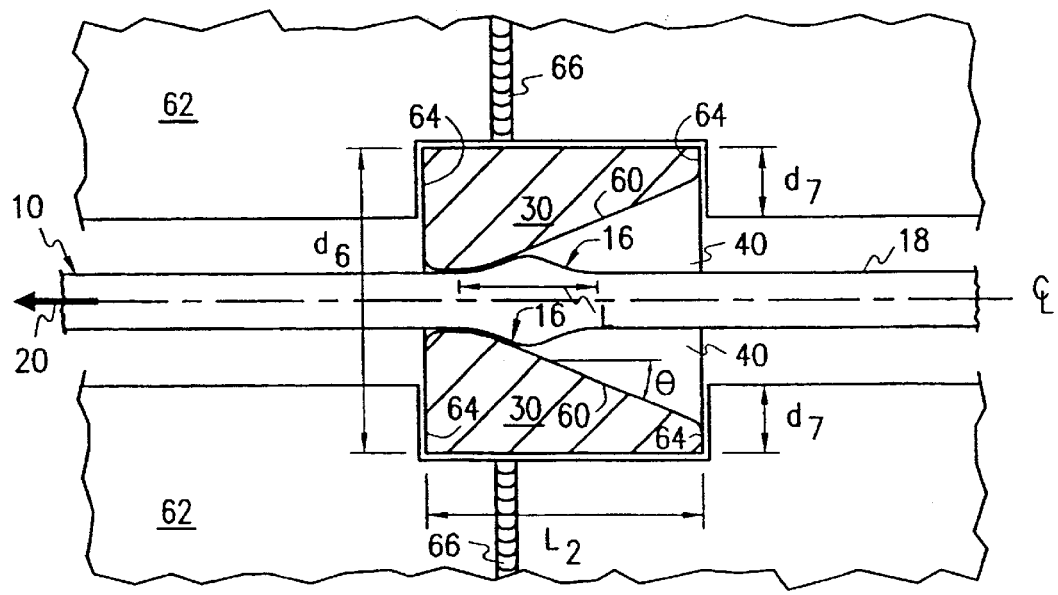
FIG. 5 is a side view cross-section of an optical fiber with an increased diameter region and yet another attachment mechanism engaged therewith, in accordance with the present invention.

Referring to FIG. 5, instead of the ferrule 30 having a long cylindrical shape, it may be shorter and/or wider and may resemble a washer, bead or bearing jewel. For example, the ferrule 30 in FIG. 5 has an outer diameter d6 of about 0.033 inches and a length L2 of about 0.031 inches with a tapered or beveled region 60 with a taper angle θ of about 13 degrees that extends beyond and overhangs at least a portion of the expanded region 16. The region 40 between the bottom side of the ferrule 30 and the right side of the expanded region 16 (and a portion of the fiber 10) may optionally be partially or completely filled with an adhesive, e.g., solder, braze, epoxy, etc., as discussed hereinbefore. The adhesive may also fill any gaps on the left side of the region 16. Other diameters, lengths and taper angles may be used. Also, the length of the tapered region 60 may be shorter or there need not be any tapered region. The ferrule 30 may also be disposed within a housing 62, as discussed more hereinafter.

Figure 6:
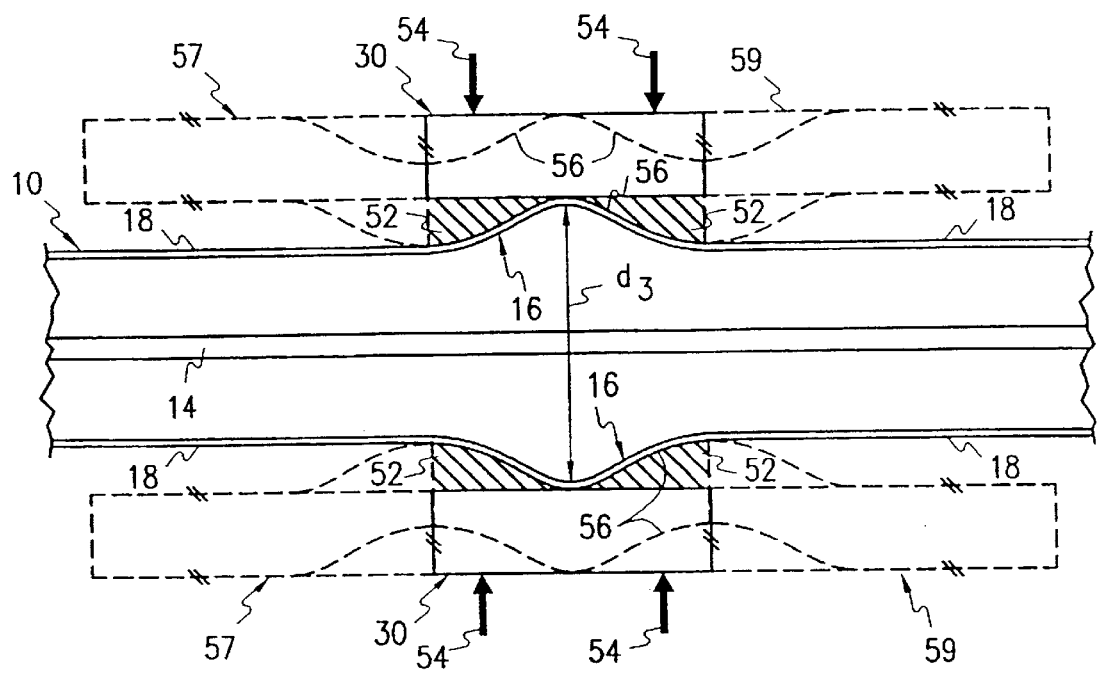
FIG. 6 is a side view cross-section of an optical fiber with an increased diameter region and an attachment mechanism having a ferrule straddling the region, in accordance with the present invention.

Referring to FIG. 6, alternatively, the ferrule 30 may be placed (or straddled) across the expanded region 16. In that case, the ferrule 30 may have a straight (cylindrical) inside diameter which is larger than, or equal to the diameter d3 of the expanded region 16 plus the thickness of the coating 18 (if used). In that case, regions 52 between the bottom side of the ferrule 30 and one or both sides of the expanded region 16 may be partially or completely filled with an adhesive, e.g., solder, braze, epoxy, etc., similar to those discussed hereinbefore. Alternatively, the ferrule 30 may be heated and/or pressure (or force) applied, e.g., by atmospheric (such as pressure and/or vacuum), mechanical (such as crimping), and/or mechanical techniques, or any other techniques, across one or both sides of the expanded region 16 as indicated by arrows 54, which causes the ferrule 30 to conform to and be against at least a portion of the expanded region 16, as indicated by the dashed line profile 56.

The ferrule 30 may be much longer than that shown in FIG. 6 to the right (as indicated by dashed lines 57) or to the left (as indicated by dashed lines 59) or along both sides, of the region 16, if desired. In that case, the ferrule 30 may be locally deformed to conform to one or both sides of the region 16. Also, if one or both sides of the ferrule 30 are made to conform to the region 16, one or more of the aforementioned adhesives may also be used. Also, such heating and/or applying of pressure (or force) may be performed on the left and/or right sides of the region 16 together, e.g., with a single crimping tool, coining tool, or the like.

Figure 7:
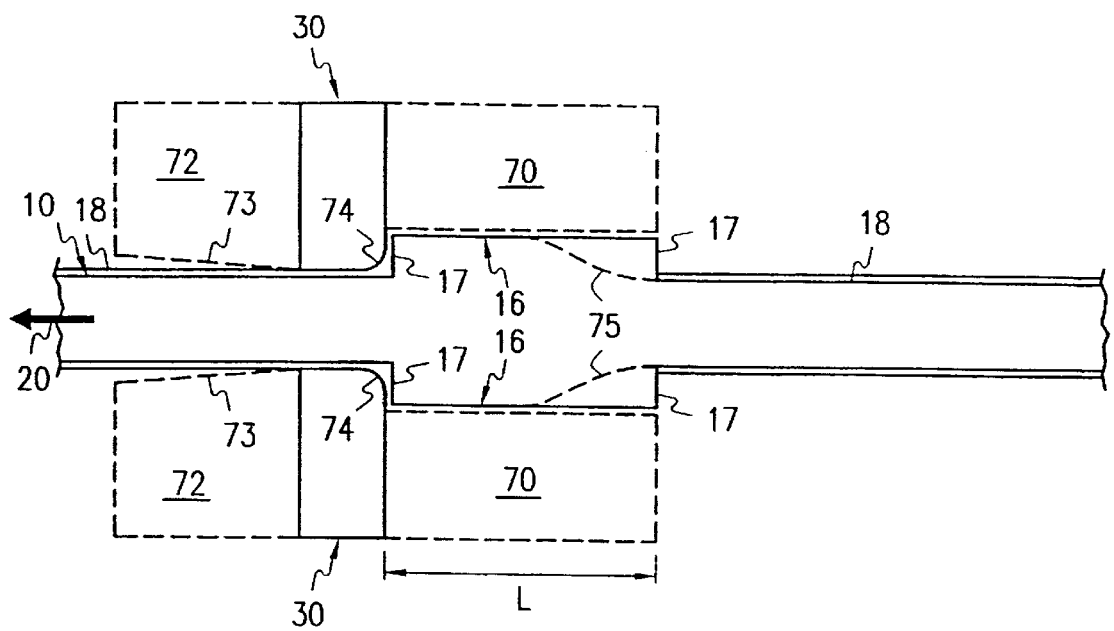
FIG. 7 is a side view cross-section of an optical fiber with an increased diameter region having a straight geometry and an attachment mechanism engaged therewith, in accordance with the present invention.

Referring to FIG. 7, in the event that the expanded region 16 has a straight geometry, such as that shown by the lines 17, the ferrule 30 may be disposed adjacent to (or against) at least one of the vertical edges 17 of the expanded region 16. In that case, the ferrule 30 may have a region 70 that overlaps all or a portion of (or overhang beyond) the top of the expanded region 16, and/or a region 72, that extends on the opposite side of the ferrule, which may have a tapered section 73, as discussed hereinbefore with FIGS. 3 and 4. Also, a corner 74 of the ferrule 30 may be rounded to minimize damage to the outer surface of the fiber or coating 18 (if used), if the ferrule 30 is slid along the fiber to the expanded region 16. Alternatively, instead of having the vertical edge 17 on both sides of the expanded region 16, the side of the expanded region 16 opposite from where the ferrule 30 contacts the edge 17 (e.g., the right side) may be rounded or another geometry, as indicated by the dashed lines 13.

Figure 8:
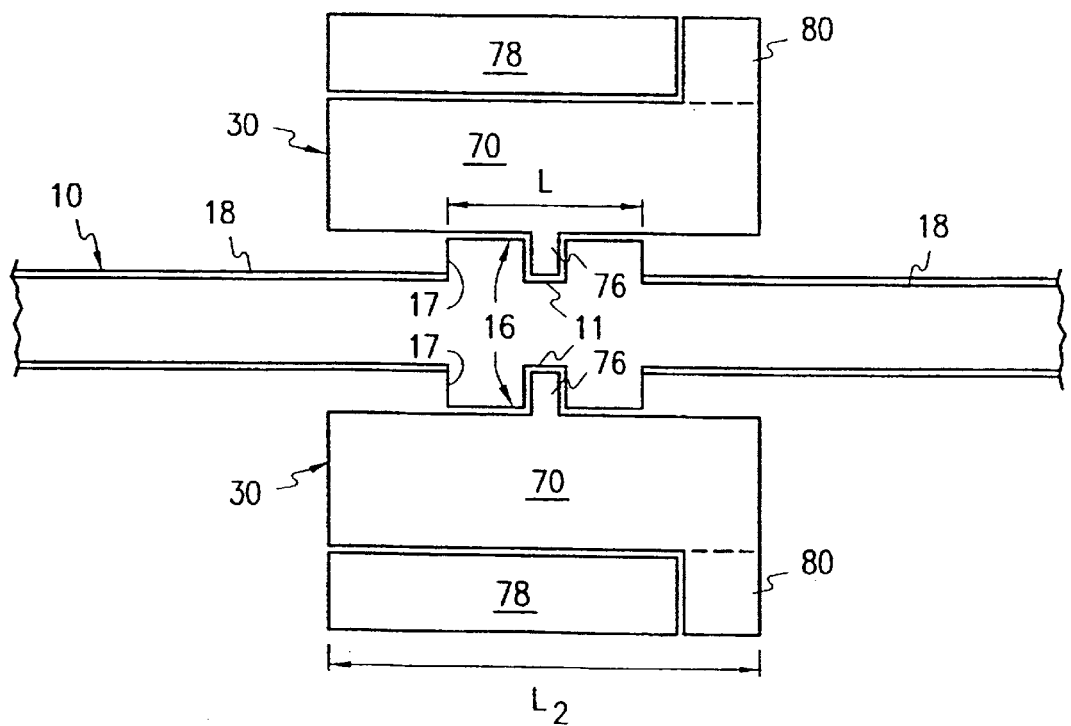
FIG. 8 is a side view cross-section of an optical fiber with an increased diameter region having a notch and a ferrule adjacent thereto, in accordance with the present invention.

Referring to FIG. 8, in the event that the expanded region 16 has a notch 11, the ferrule 30 may have an inwardly protruding section (or tooth) 76, which fits within the notch 11 to lock the fiber 10 to the ferrule 30. Also, the ferrule 30 may be a multi-piece ferrule (such as that discussed hereinbefore). In that case, to hold the ferrule 30 together, the ferrule 30 may be self-locking or there may be a collar 78 around the ferrule 30. Also there may be a raised section 80 (at either end of the ferrule 30) to provide a stop for the collar 78 or for other purposes. The notch 11 need not be centered along the expanded region 16, and the size of the tooth 76 need not match the dimensions (e.g., length, depth) of the notch 11. Also, there may be more than one notch 11 and tooth 76. Further the length L2 of the ferrule 30 may extend beyond the length L of the expanded region 16, but is not required to.

Figure 9:
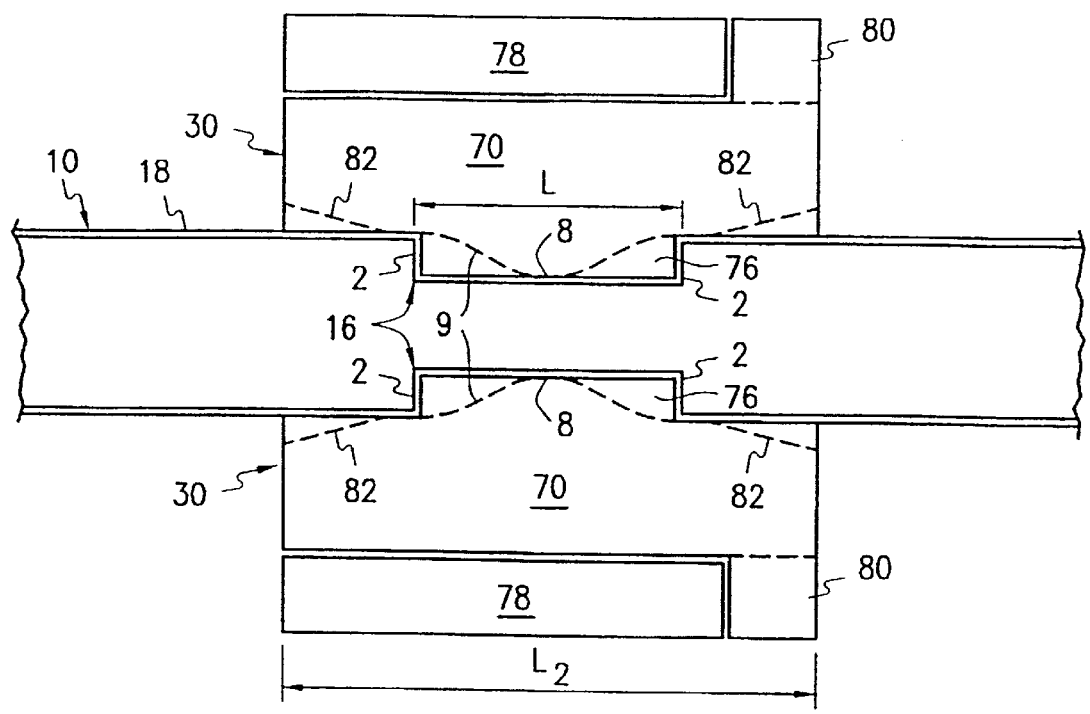
FIG. 9 is a side view cross-section of an optical fiber with a decreased diameter region and an attachment mechanism engaged therewith, in accordance with the present invention.

Referring to FIG. 9, alternatively, if the region 16 comprises a recess 8, the tooth 76 of the ferrule 30 would be sized to substantially match at least a portion of the geometry of the recess 8. For example, if the geometry of the recess 8 is curved, as indicated by the dashed lines 9, the tooth 76 of the ferrule 30 would likely also be curved. If the geometry of the recess 8 has sharp edges 2, the tooth 76 may likely have at least one sharp edge to match at least one of the edges 2. Also the length of the tooth 76 may be shorter than the length of the recess 8. Further, the length L2 of the ferrule 30 may be longer than the length L of the recess 8. In that case, there may be one or more tapered surfaces 82, similar to that discussed hereinbefore, to reduce fiber stresses.

Figure 10:
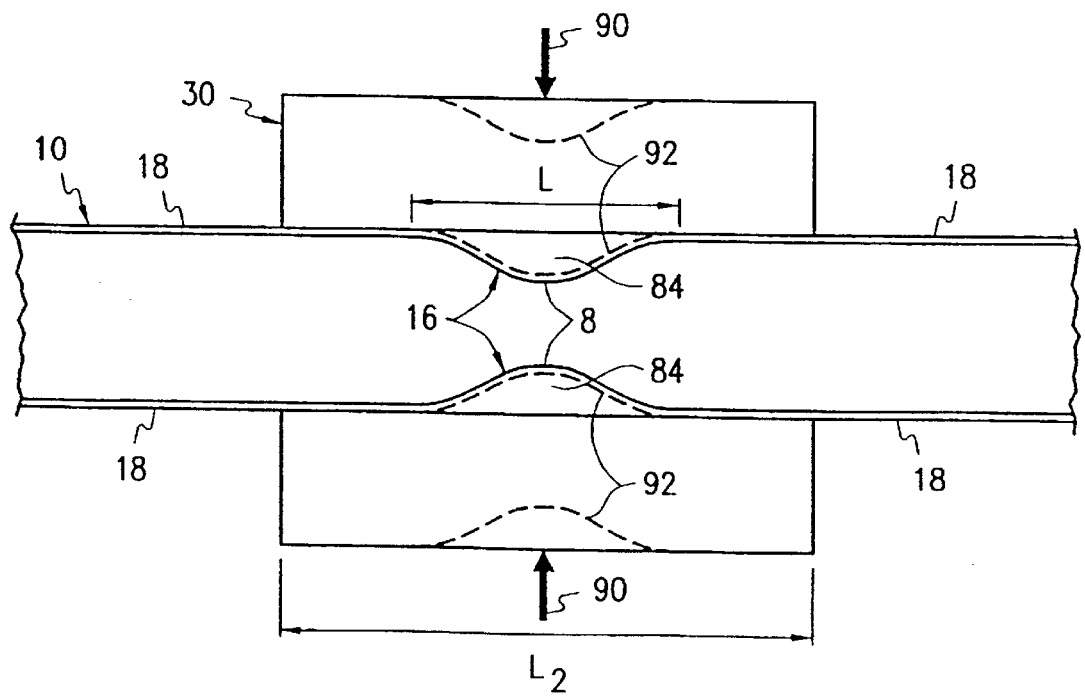
FIG. 10 is a side view cross-section of an optical fiber with a decreased diameter region and another attachment mechanism engaged therewith, in accordance with the present invention.

Referring to FIG. 10, alternatively, if the region 16 has the recess 8, the ferrule 30 may be a single or multi-piece cylindrical tube (or sleeve), which is placed (or slid) over the recess 8. In that case, a region 84 between the inside of the ferrule 30 and the outside of the recess 8 may be partially or completely filled with an adhesive, e.g., solder, braze, epoxy, etc., similar to those discussed hereinbefore. Instead of using an adhesive, the ferrule 30 may be heated and/or pressure applied across the recess 8., e.g., by atmospheric (such as pressure and/or vacuum), mechanical (such as crimping), and/or magnetic techniques (such as electromagnetic forming), or any other technique, as indicated by arrows 90, which causes the ferrule 30 to conform to at least a portion of the shape of the recess 8, as indicated by the dashed line profile 92. For a glass ferrule, the ferrule 30 may be heated to a temperature at or below the softening temperature of the glass. For a metal ferrule, the ferrule may be heated to a temperature where the metal can be shaped.

The ferrule 30 of any of the embodiments discussed herein may be connected to or part of a structure (or housing), as discussed hereinbefore in the Background Art section hereto. Various techniques for attaching the ferrule 30 to the structure may be used, which depend on the application and the material of the ferrule 30.

For example, referring to FIG. 5, a housing 62 may surround at least a portion of the ferrule 30 to hold the ferrule

30 in a predetermined position. The housing 62 has a notch 64, which is substantially the same length or longer than the length L2 of the ferrule 30. The depth d7 of the notch 64 is deep enough to hold the ferrule 30 from moving axially (in at least one direction). Also, the depth d7 may be deep enough to almost touch the fiber 10 (which may reduce non-axial motion of the fiber 10). The shape of the housing 62 and the notch 64 may be cylindrical, rectangular or any other shape that allows the notch 64 to hold the ferrule 30. The housing 62 may also be bonded to the ferrule 30 using an adhesive discussed hereinbefore (e.g., solder, braze, epoxy, etc.). Also, the housing 62 may be anchored to the ferrule 30 by mechanical means, such as one or more set screws 66. Other techniques for attaching the ferrule 30 to the housing 62 may be used. The housing 62 may be used with any of the ferrules 30 discussed herein with suitable changes for the ferrule geometry.

Figure 11:
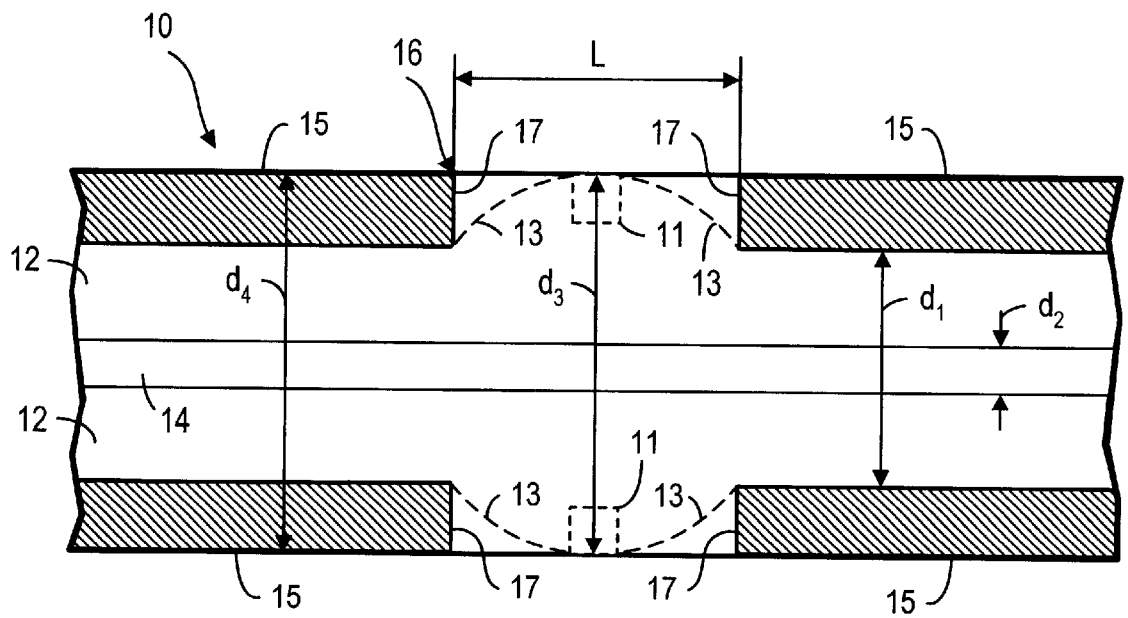
FIG. 11 is a side view cross-section of an optical fiber showing a technique for creating an increased diameter region in an optical fiber, in accordance with the present invention.

One technique for making the expanded region 16 in the optical fiber 10 is to use a fiber (or fiber section), which has an enlarged diameter d4 substantially equal to or greater than the diameter d3 of the region 16. The fiber section may be made using a suitable glass pre-form with a cladding/core diameter ratio that can be drawn down using conventional techniques to achieve the desired core size but has a cladding outer diameter d4 which is greater than the desired value for the final optical fiber. To create the expanded region 16, as shown in FIG. 11, the diameter d4 of the fiber 10 is reduced to the desired diameter by eliminating an outer portion 15 of the cladding by conventional (or yet to be developed) glass manufacturing techniques, e.g., grinding, etching, polishing, etc. If desired, some of the outer diameter of the region 16 may also be removed. Using chemical etching (e.g., with hydrofluoric acid or other chemical etches), laser etching, or laser enhanced chemical etching are some techniques, which reduce the fiber's outer diameter without applying direct contact force, as is required by grinding and polishing. Certain types of etching may produce a sharper vertical edge 17 on the region 16, or an angled or curved edge 13. Also, selective etching may produce a notch 11 (or more than one notch) in the region 16 (see FIG. 8). Also, the etching may produce the sharp edge 17 at one side (e.g., the left side) of the region 16 and the curved geometry 13 on the other side (e.g., the right side) of the region 16, as shown in FIG. 7.

Fire polishing using conventional techniques, i.e., applying heat for a predetermined time across the region 16, may be performed after the etching to smooth any rough surfaces that may be left by the etching process (as rough surfaces may increase stress levels and reduce fatigue life in dynamically loaded fibers). The fiber section may then be optically connected, e.g., by fusion splicing, by an optical connector, etc. to a standard-sized fiber (not shown) having a cladding and core which match the final fiber section described hereinbefore.

Figure 12:
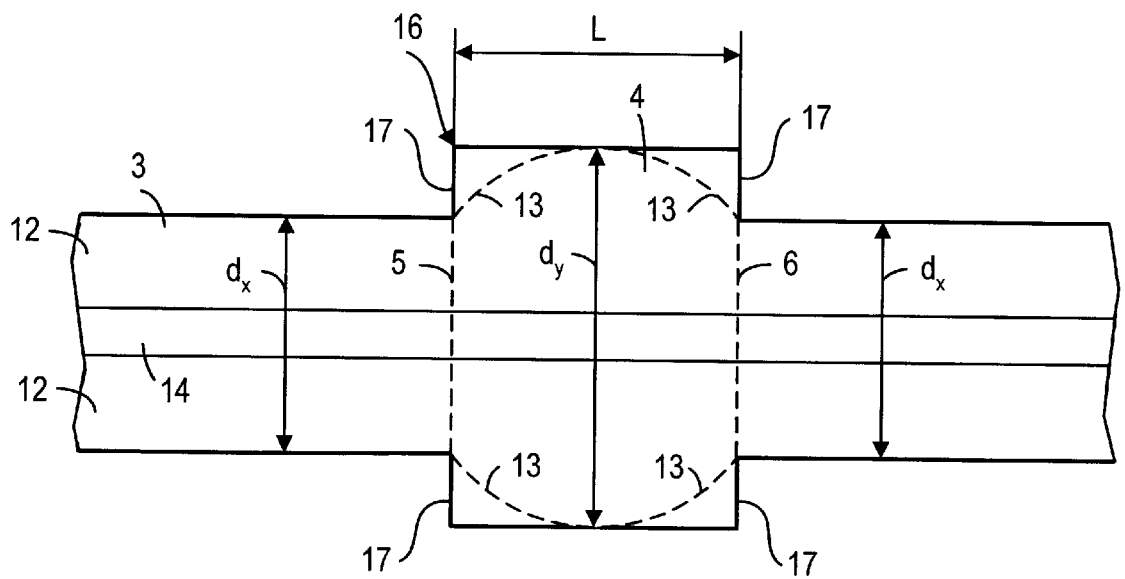
FIG. 12 is a side view cross-section of an alternative technique for creating an increased diameter region in an optical fiber, in accordance with the present invention.

Referring to FIG. 12, alternatively, instead of the region 16 being made using a single axially continuous fiber, a fiber 4 having a length L and an outer diameter dy e.g., 125 microns, is fusion spliced between two fibers 3 having an outer diameter dx, e.g., 80 microns, at interfaces 5,6. The fibers 3,4 have the same core 14 diameter, e.g., 9 microns, and may be fusion spliced using known splicing techniques. Other diameters for the claddings and cores of the fibers 3,4 may be used. The edge 17 may be a vertical edge or may be a curved edge, as shown by the dashed lines 13. Depending on the application, it may be desirable and/or acceptable to have only one change in the outer dimension of the fiber (or two changes located a long distance apart). In that case, there would be one splice, e.g., at the interface 5, between the fibers 3,4 and the fiber 4 would be longer than that shown in FIG. 12.

Figure 13:
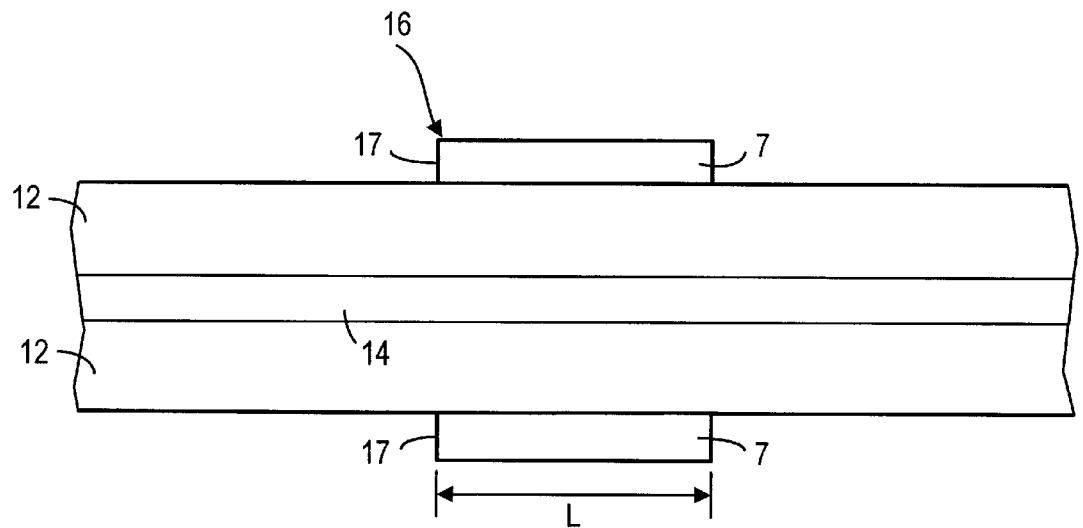
FIG. 13 is a side view cross-section of yet another technique for creating an increased diameter region in an optical fiber, in accordance with the present invention.

Referring to FIG. 13, alternatively, a glass/ceramic tube (or sleeve) 7 may surround the fiber 10 to create the expanded region 16. In that case, the tube 7 is heated to the melting or softening temperature of the tube 7 such that the tube 7 is fused to or becomes part of the cladding 12. The tube 7 has a softening temperature, which is the same as or slightly lower than that of the fiber 10. Any form of heating may be used, e.g., oven, torch, laser filament, etc. The tube 7 may be a single cylindrical piece or have multiple pieces to surround the fiber 10. To help keep the tube concentric with the fiber, the process may be performed with the fiber held vertically. Also, more than one concentric tube may be used around the fiber if desired, each tube being melted onto an inner tube at the same time or successively.

Figure 14:
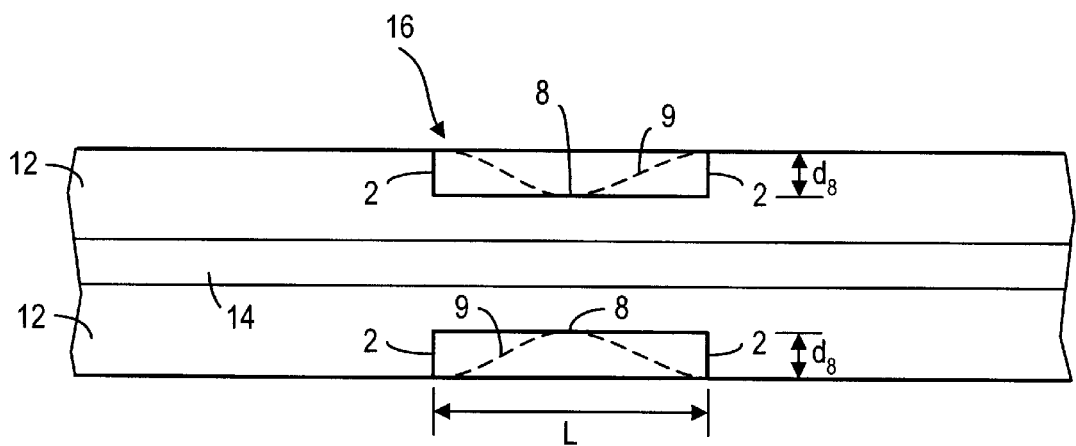
FIG. 14 is a side view cross-section of an alternative technique for creating a decreased diameter region in an optical fiber, in accordance with the present invention.

Referring to FIG. 14, alternatively, instead of the region 16 being an expanded outer dimension (or diameter), the region 16 may comprise a decreased outer dimension (or recess or depression or notch) 8 in the waveguide 10. The recess 8 may be created by numerous techniques, such as by reducing the outer diameter of the fiber 10 using the techniques discussed hereinbefore with FIG. 11 (e.g., grinding, etching, polishing, etc.), by splicing a smaller diameter fiber between two larger diameter fibers, such as that discussed hereinbefore with FIG. 12, or by heating and stretching the desired region of the fiber by pulling on one or both ends of the fiber 10 (i.e., putting the fiber 10 in tension) using a technique similar to that for heating and compressing the fiber to create a bulge in the fiber 10 (i.e., stretching instead of compressing), such as is described in conjunction with FIG. 15. Etching the fiber 10 may created recessed vertical edges 2 (into the fiber 10) or a curved or angled recessed geometry 9, and heating and stretching the fiber 10 creates the curved geometry 9. The depth d8 of the recess 8 may be the same as the distance the expanded region 16 in FIGS. 3–5 extends from the cladding 12 diameter, e.g., about 75 microns. Other depths may be used.

If heating and stretching are used to create the recessed region 8, such a process may be performed with the longitudinal axis of the fiber 10 aligned horizontally or vertically or with other orientations. One advantage to vertical orientation is that it minimizes axial distortions caused by gravitational effects of heating a fiber. Alternatively, the fiber may be rotated during heating and stretching to minimize gravity effects.

For any of the embodiments described herein, precise symmetry (axial or cross-sectional) of the region 16 (for either expanded or recessed regions) are not required for the present invention. For example, the lower portion of the regions 16,8 may be slightly larger or smaller than the upper portion, or vise versa. However, the core 14 should retain axial alignment along both sides of the region 16 (or 8) to minimize optical losses from the core 14 as light travels through the region 16. The better the axial alignment of the core 14, the lower the optical loss. Although the core 14 at the region 16 are shown as being straight, it should be understood that there may be some small amount of deformation of the core 14. The less deformation of the core 14 at the region 16, the lower the amount of optical loss. We have measured total optical losses as low as 0.06 dB; however, lower losses may be achieved. The better the axial alignment of the core 14, the lower the optical loss. Although the core 14 at the expanded region 16 is shown as being straight, it should be understood that there may be some small amount of deformation of the core 14. The less deformation of the core 14 at the bulge location, the lower the amount of optical loss. Also, the strength of the fiber 10 remains strong after the expanded region 16 is created. For example, we have measured a proof force of up to 4.66 lbs. of axial tension force on the fiber 10 before breakage occurs, which is comparable to a good fusion splice. Other fiber strengths may be obtained depending on the settings and method used to make the expanded region 16.

Also, for any of the embodiments described herein, instead of an optical fiber 10, any optical waveguide having a core and cladding may be used, e.g., a flat or planar waveguide, on which the region 16 can be created. In the case of a flat or planar waveguide, the region 16 may be on the upper and/or lower surfaces of the wave guide. Also, a multi-mode optical waveguide may be used if desired.

The region 16 may have other shapes (or geometries) than those described herein, provided at least a portion of the optical waveguide has a variation region, deformation or change (expanded and/or recessed) of the outer dimension of the waveguide.

Also, a combination of any of the above techniques for creating the region 16 may be used. For example, the etching technique discussed in conjunction with FIG. 11 may be used to alter the geometries described with FIGS. 12–14. Other techniques than those described herein may be used if desired to create the region 16.

Also, the region 16 described with FIGS. 11–14 may be combined to provide both an expanded outer diameter region and a reduced diameter region. Further, more than one of the regions 16 may be provided along a given optical fiber if desired.

After the regions 16 are made, the cladding 12 may be coated or re-coated with a protective overcoat or buffer layer (see FIG. 3, for example), such as a metal, polymer, teflon, and/or carbon, or other materials, which may be used to protect the fiber and/or enhance attachment to the fiber.

Figure 15:
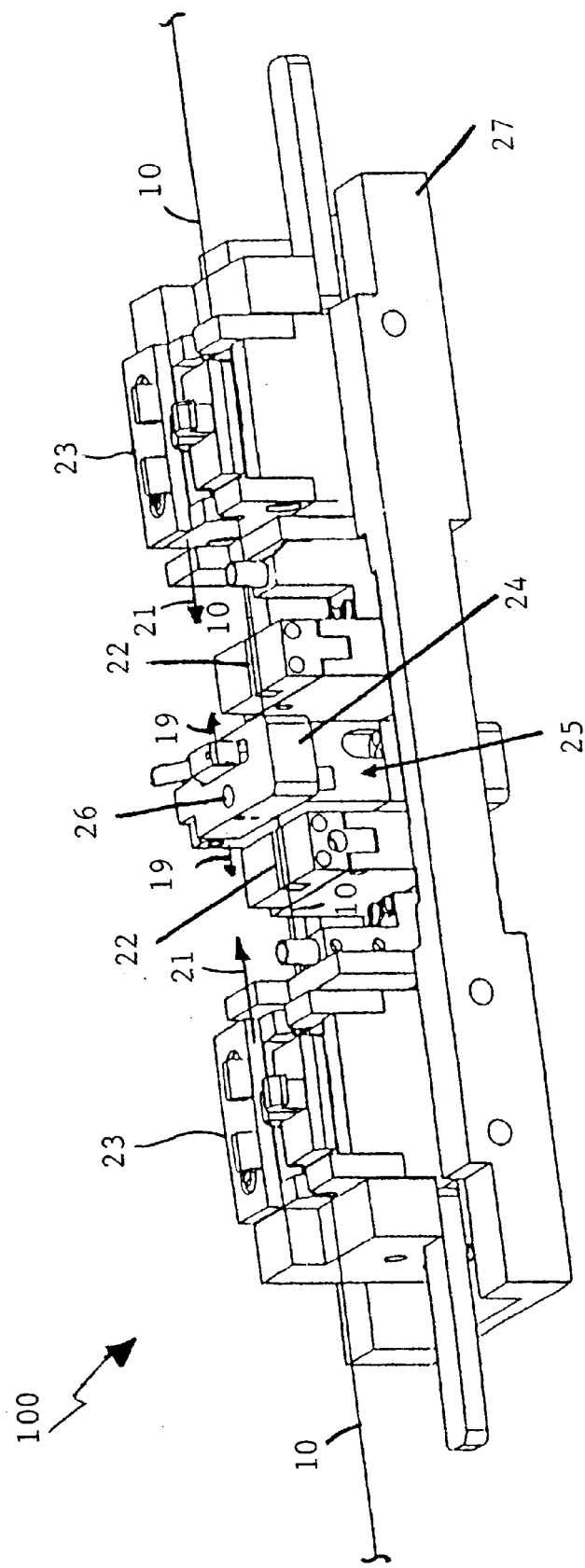
FIG. 15 is a perspective view of a device that may be used to create an increased diameter region in an optical fiber, in accordance with the present invention.
Figure 16:
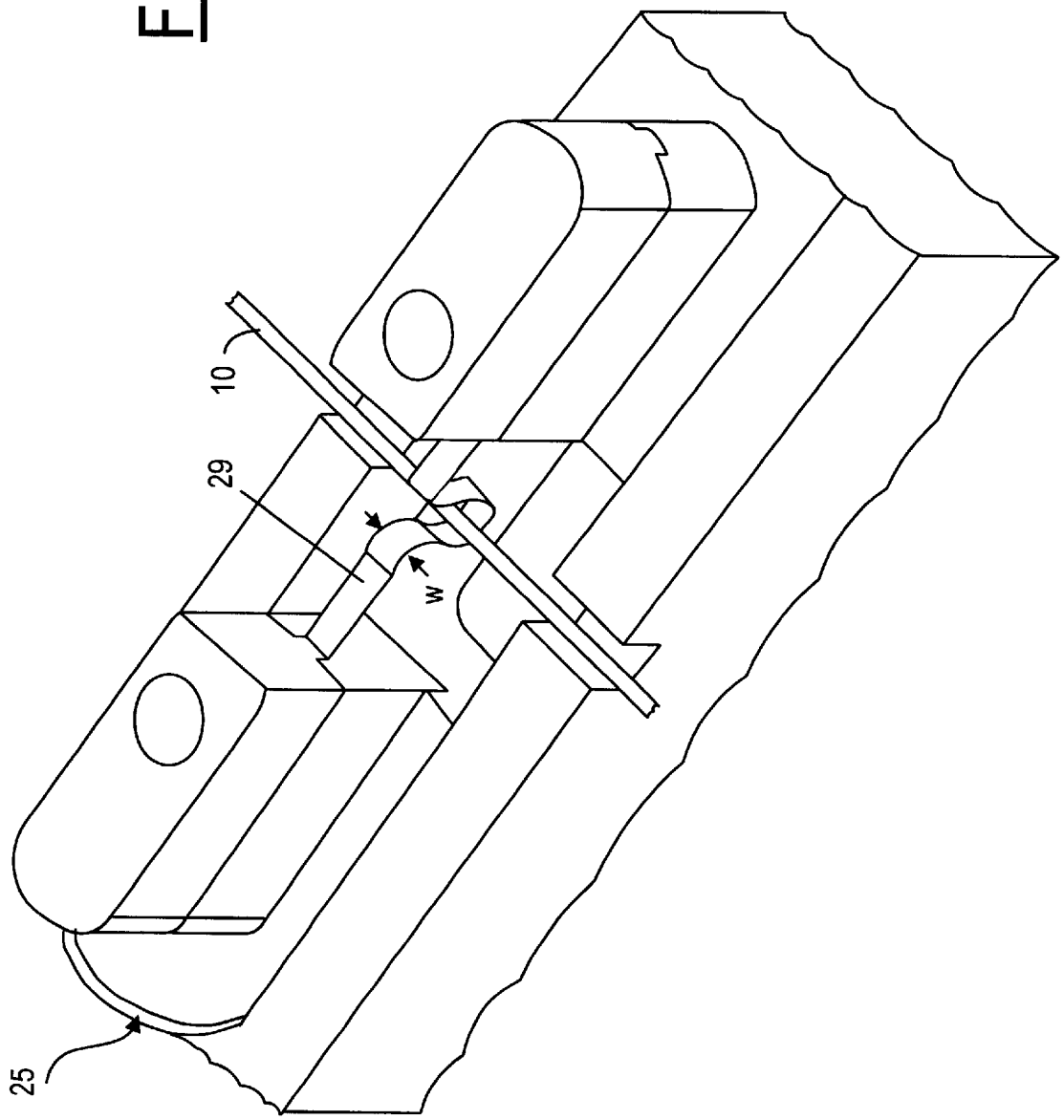
FIG. 16 is a blown-up perspective view of a heating filament used to heat an optical fiber, in accordance with the present invention.

Referring to FIGS. 15 and 16, one technique for making the expanded region 16 in the optical fiber 10 is to heat and compress the fiber 10 as follows. First, the fiber 10 is prepared by stripping any protective over-coating or buffer layers from the fiber 10 to expose the cladding 12 of the fiber 10 in at least the area where the expanded region 16 is to be made. This may be done by chemical or thermal techniques, such as dipping the desired section of the fiber in a hot bath of sulfuric acid. Then, the fiber is cleaned using well known procedures in the field of optical splicing, such as dipping in deionized water and then in isopropyl alcohol. Other stripping and/or cleaning techniques may be used if desired, providing they do not damage the fiber.

Referring to FIGS. 15 and 16, a device 100 that may be used to make the expanded region 16 is a Model FFS-1000 Filament Fusion Splicing System, made by Vytran Corp. The device 100 comprises a pair of movable fiber holding blocks 23, a pair of vacuum V-groove fiber holders 22, a movable splice head 25 and a hinge-mounted splice top 24 with a filament port hole 26. The fiber holding blocks 23 comprise a U-shaped frame and a center, spring-loaded block that contains a vacuum V-groove insert, in which the fiber is inserted. The components 22, 23 are aligned such that the fiber 10 lies substantially along a straight line. Within each of the fiber holding blocks 23, a stepper motor-driven worm-gear rotary mechanism (not shown) allows for movement of the blocks 23 (and thus the fiber 10) along the longitudinal axis of the fiber 10. The parts 22–26 are supported by a transfer jig or housing 27. The splice head 25 comprises a heat source, e.g., a resistive heating element (such as a Tungsten filament ribbon) 29 (FIG. 16) having a width W of about 0.025 inches, which provides radiation heating evenly around the circumference of the fiber 10.

Other heating techniques may be used if desired, e.g., a laser, a small oven, a torch, etc. Also, other devices and components for aligning and axially compressing the fiber 10 may be used, if so desired.

The fiber 10 is placed in the blocks 23 and the holders 22 (and across the splice head 25), which places the longitudinal axis of the fiber 10 substantially along a straight line, i.e., in axial alignment (along the longitudinal or Z-axis of the fiber). The vacuum in the vacuum V-groove fiber holders 22 is set strong enough to keep the fiber in axial alignment but not so strong as to cause surface defects on the fiber. Next, the fiber 10 is heated where the bulge is to be made by applying a predetermined amount of power to the filament 29, e.g., about 26 Watts power. The heating element reaches a temperature (approximately 2100° C.), such that the glass is at about 2000° C. (the melting or softening temperature of the glass fiber). The heat is applied to the fiber for a duration (pre-heat time) long enough to soften the fiber 10 enough to be compressed, e.g., approximately one second.

Then, while heat is still being applied to the fiber 10, the fiber 10 is compressed axially by translation of the blocks 23 toward each other as indicated by the arrows 21 by the motors within the blocks 23. The total translation of the blocks 23 (and thus compression of the fiber 10) is about 400 microns at a rate of 100 microns/sec for about 4 seconds. Other compression amounts, rates, and times for the axial compression may be used, if so desired. Compression may be achieved by moving one or both blocks 23 provided the same total motion occurs. After the compression is complete, the heating of the fiber may be maintained for a predetermined post-compression time, approximately 0.25 seconds, to allow the expanded region 16 to reach final form. Other pre-heat times and post-compression times may be used.

Next, the fiber 10 is again heated with the filament 29 (or "fire polished") to remove surface defects, at a power setting of about 21.5 Watts. During fire polishing, the filament (and the splice head 25) is moved back and forth (e.g., 2 full passes) across a predetermined length of the fiber (about 2500 microns) across where the expanded region 16 was formed, as indicated by the arrows 19, for a duration of about 3 seconds. Other fire polishing power (temperature), number of passes, and time settings may be used, if so desired, provided the surface defects are removed and the expanded region 16 is substantially not altered or deformed. The fire polishing may be performed immediately after forming the expanded region without stopping the heating of the fiber, or the heating of the fiber may be stopped (filament turned off) for a predetermined period of time after compression is complete and then turned on to perform the fire polish.

Also, during heating, the area within the splice head 25 around the fiber 10 is purged with flowing high purity argon gas to keep the fiber clean and to prevent high temperature oxidation of the tungsten filament.

The parameter settings (times, powers, etc.) described above result in an acceptable combination of mechanical strength and low optical loss. However, other suitable parameter combinations may be used, if desired, to obtain a similar effect, which may be determined by one skilled in the art in view of the teachings herein.

The process described for making the expanded area 16 may be performed with the longitudinal axis of the fiber 10 (and the device 100) aligned horizontally or vertically or with other orientations. One advantage to vertical orientation is that it minimizes axial distortions caused by gravitational effects of heating a fiber. Alternatively, the fiber may be rotated during heating and compression to minimize gravity effects.

After the expanded area 16 is made, the cladding 12 may be re-coated with the protective overcoat or buffer layer 18 (see FIG. 3, for example), such as a metal, polymer, teflon, and/or carbon, or other materials.

The ferrule 30 may have other shapes, sizes, and/or designs than those described herein, that has at least a portion of the ferrule 30 that mechanically locks, stops, or otherwise is disposed against at least a portion of the variation region 16 (or 8), so as to minimize (or substantially prevent) relative movement (or creep) in at least one direction between the fiber 10 and the ferrule 30 (i.e., substantially prevents the fiber 10 from moving in a predetermined direction relative to the ferrule 30 and substantially prevents the ferrule 30 from moving in a direction opposite to the predetermined direction relative to the fiber 10), which causes the fiber 10 to substantially track movement of the ferrule 30. Also, the ferrule 30 may be placed against the right side of the expanded region 16 instead of, or in addition to, the left side of the expanded region 16.

Also, instead of a ferrule 30, the region 16 may be placed in a housing or any other structure having an internal shape that mechanically locks, stops, or otherwise is disposed against at least a portion of the variation region 16, which minimizes relative movement (or creep) in at least one direction between the fiber 10 and the ferrule 30. Also, although the fiber 10 and ferrule 30 are shown herein as being oriented horizontally, the invention will work independent of the orientation of the fiber 10 and the ferrule 30, e.g., vertical, horizontal, or any other orientation.

Figure 18:
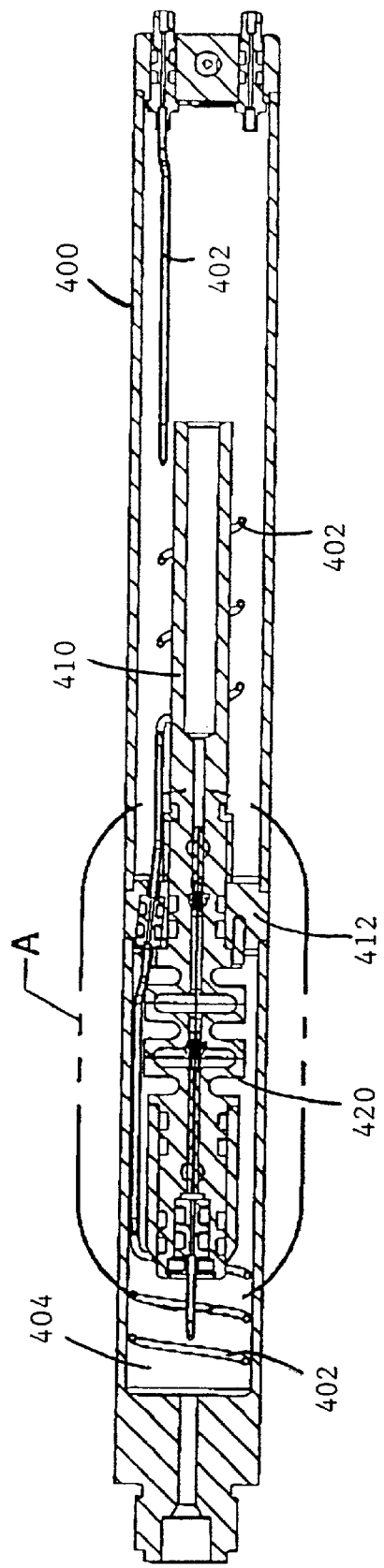
FIG. 18 is a side view cross-section of an exemplary embodiment of a housing for implementing the pressure sensor, according to the present invention.
Figure 19:
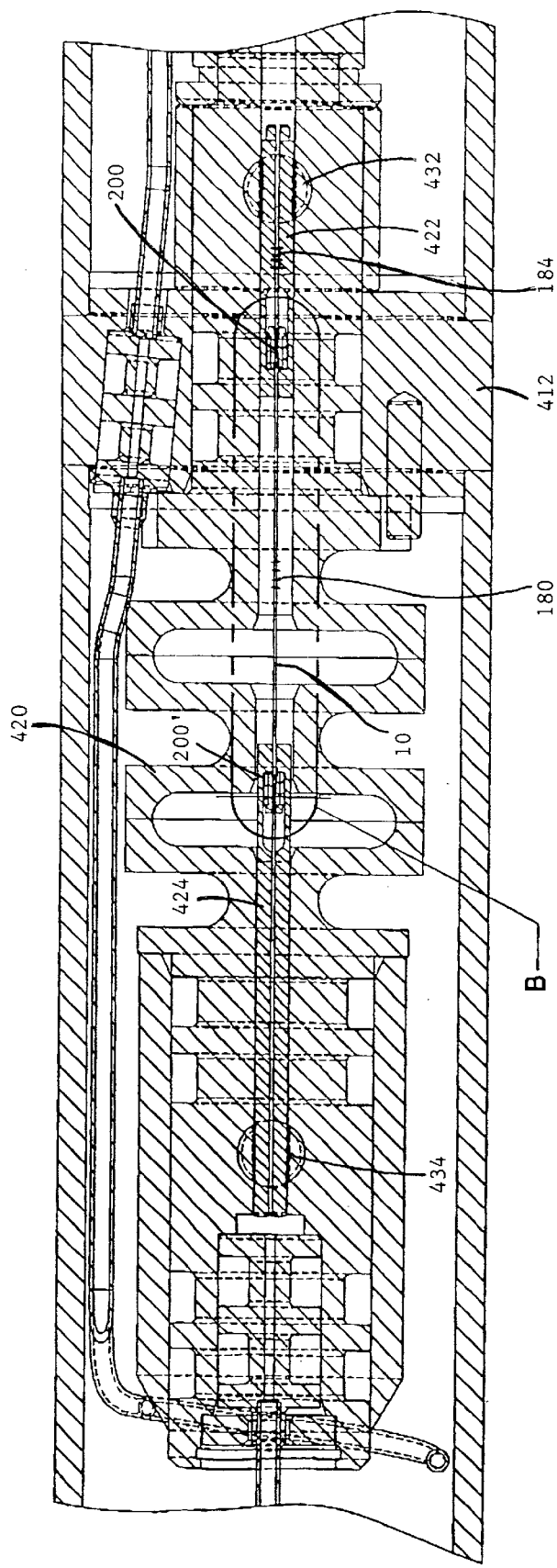
FIG. 19 is a blown-up cross-section of the housing showing a bellows structure and two tubes for mounting a pair of attachment mechanisms, according to the present invention.
Figure 20:
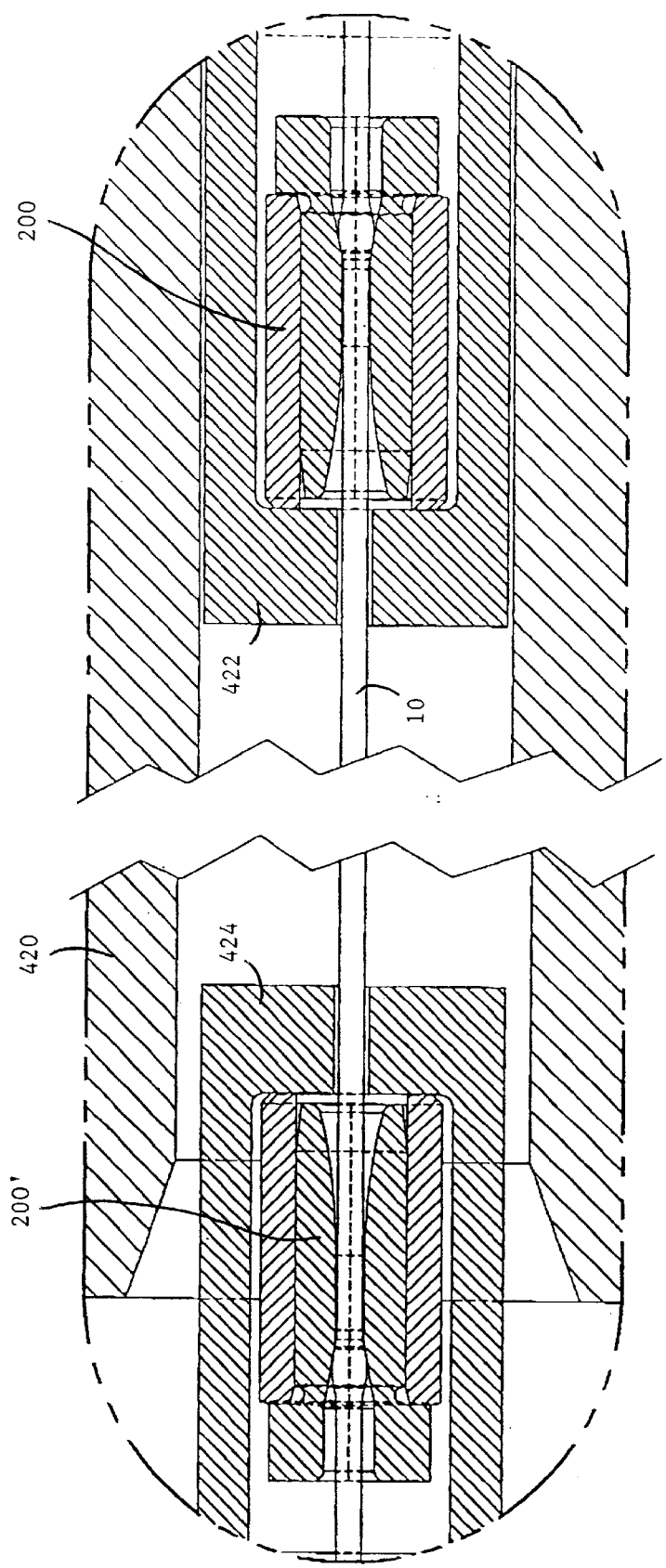
FIG. 20 is a blown-up cross-section of the bellows structure and the tubes.

In the detailed description taken in conjunction with FIG. 1 through FIG. 16, the emphasis has been placed on the pressure sensing technique using a Bragg grating imparted in an optical fiber fixedly mounted on two creep-resistant attachment mechanisms. In particular, it has been described that the spacing of the Bragg grating is subject to change due to the pressure in an environment. It should be noted that, in addition to pressure, temperature also can cause changes in the effective spacing 8 in the Bragg grating 180 (FIG. 2) in two different ways, as is known. One is due to the thermal expansion of the optical fiber and the mechanical attachments that restrict the movement of the optical fiber along the longitudinal axis thereof. The other is the optical path length change due to the change dn/dT of refractive index of the fiber core. Thus, the reflected signal 192 could also indicate changes in temperature as well as pressure. It is, however, possible to eliminate or compensate for the temperature effect in the reflected signal 192. For example, a second grating 184 may be placed in the fiber 10 outside the region so that it is not subject to strains based on pressure, but is in close thermal proximity to the grating 180 sensitive to pressure. By measuring the λ shift from both gratings, the effect of temperature can be eliminated. (Also, see U.S. Pat. No. 6,016,702 to Maron.) This type of "athermal" pressure sensor is also shown in FIGS. 18–20 discussed hereinafter. Alternatively, it is possible to use a slab of material having a certain coefficient of thermal expansion to cancel out the wavelength shift in the reflected signal, as described in U.S. patent application Ser. No. 09/699,940 entitled "Temperature Compensated Optical Device", which is incorporated herein by reference in its entirety.

Figure 17:
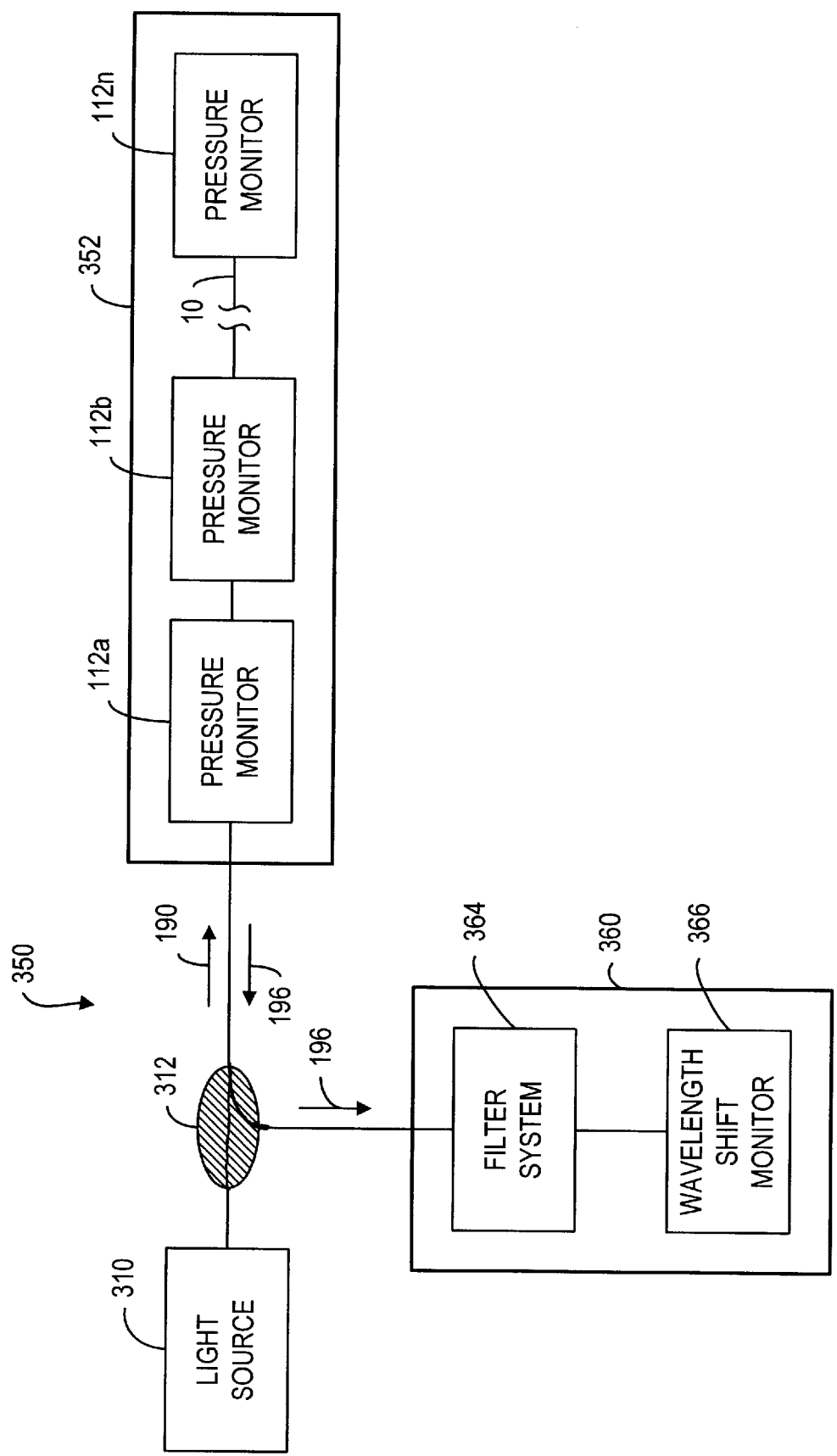
FIG. 17 is a schematic block diagram of an optical signal processing system for analyzing an optical signal provided by one or more pressure sensors, according to the present invention.

FIG. 17 illustrates an optical signal processing system 350 for analyzing an optical signal provided by one or more pressure sensors. As shown, a distributed pressure sensing system 352 comprises a plurality of pressure monitoring sections 112a, 112b, . . . , 112n for measuring pressure at a plurality of locations in an environment. Each of the pressure monitoring sections has a pressure sensor similar to the pressure sensor, as shown in FIGS. 2, 18–21. As shown in FIG. 17, a broadband light source 310 is coupled to the optical fiber 10 via the coupler 312. The coupler 312 directs light 190 to the distributed pressure sensing system 352. The reflected optical components 196 from the optical sensing system are directed to an optical signal processing unit 360. A filter system 364 is used to separate the response from different pressure monitoring sections 112a, 112b, . . . , 112n. The filter system 364 separates the optical signals produced by each Bragg grating 180, 184 (see FIG. 19) by means of selective filtering. The wavelength shifts in the optical signals are analyzed by a wavelength shift monitoring device 366, such as that described in U.S. Pat. No. 6,016, 702, entitled "High Sensitivity Fiber Optic Pressure Sensor for Use in Harsh Environments", to Robert J. Maron, referenced earlier.

Figure 1:
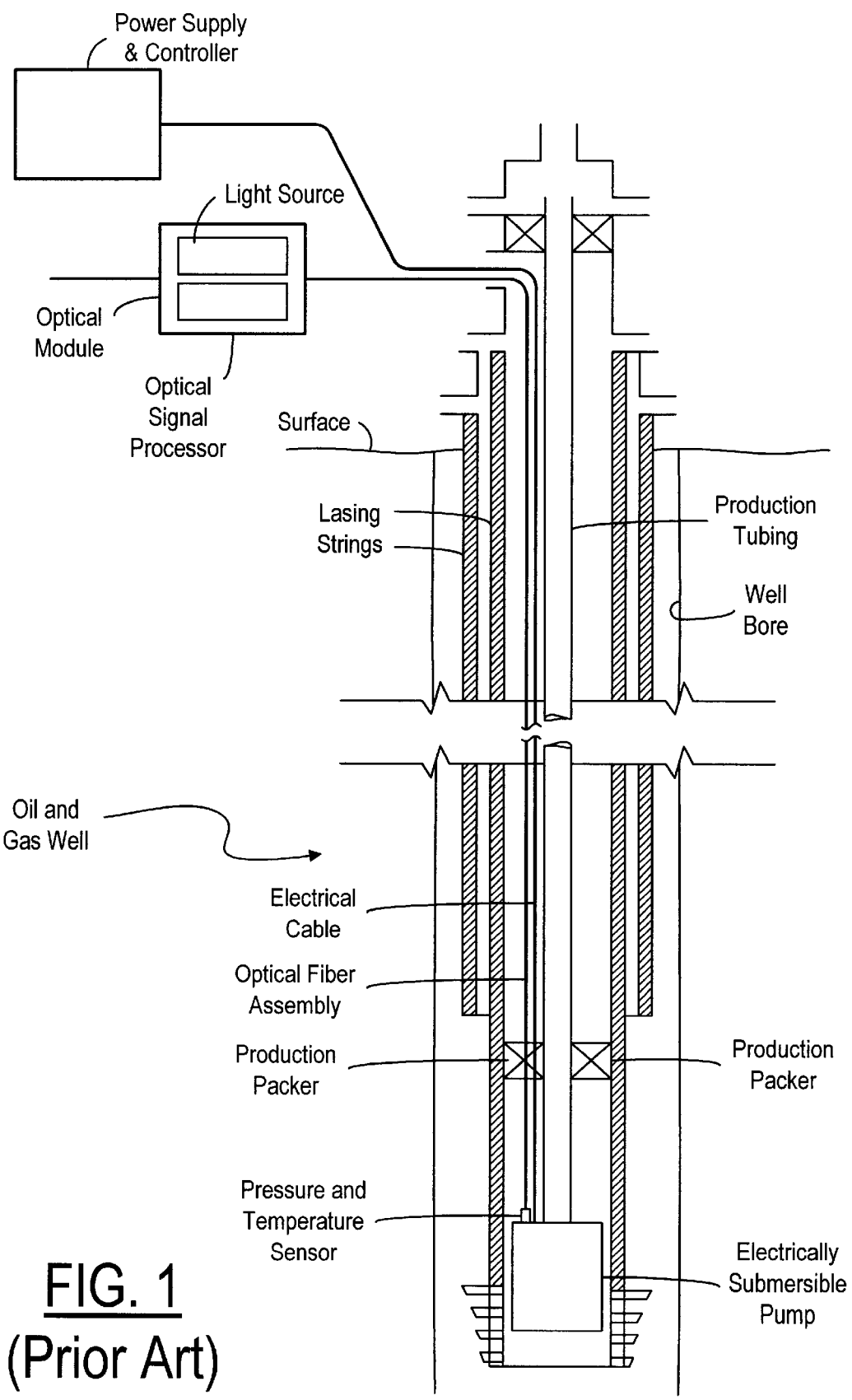
FIG. 1 is a longitudinal cross-sectional view of a prior art wellbore schematically illustrating an optical pressure sensor of the present invention being used to measure pressure in a harsh environment.

FIG. 18 is a side view cross-section of a housing 400 for implementing a pressure sensor, according to the present invention, to measure pressure in a harsh environment, such as a wellbore, as shown in FIG. 1. As shown, the housing 400 has a tubing 402 for providing an optical fiber 10 (FIG. 20) and a mounting mechanism 410 for mounting the tubing 402. The housing 400 also has an anchoring section 412 for mounting the mounting mechanism 410 and a multi-element bellows structure 420, allowing the multi-element bellows structure 420 to be compressed or expanded at the end 404. The housing is used to protect the components included therein from mechanical damage. Preferably, the housing 400 is made of a high strength, rigid wall, corrosion-resistant material, such as stainless steel. A section A of the housing is shown in detail in FIG. 19.

Referring to FIG. 19, an attachment mechanism 200 is mounted on one end of the multi-element bellows structure 420 via a straight tube 422 and another attachment mechanism 200' is mounted on the opposing end of the multi-element bellows structure 420 via another straight tube 424. The grating 180 is located in the fiber 10 between the two attachment mechanisms 200, 200'. The straight tubes 422, 424 are secured to the bellows structure 420 with set screws 432 and 434. It is preferred that the straight tubes 422 and 424 are used to set the fiber 10 in tension so that when the housing is placed in a wellbore, the pressure in the wellbore partially relieves the tension in the fiber 10. A section B of the bellows structure 420 and the mechanical components for mounting the fiber 10 is shown in FIG. 20. As the fiber 10 is pulled outward by the attachment mechanisms 200, 200', the straight tubes 422, 424 controls the separation between the attachment mechanisms 200, 200'. It is possible to use a material for the tubes 424, 422 and the structure 420 having a coefficient of thermal expansion (CTE) so as to compensate for the wavelength up-shift of the fiber 10 due to the increase in the refractive index of the fiber core with regard to temperature.

Figure 21:
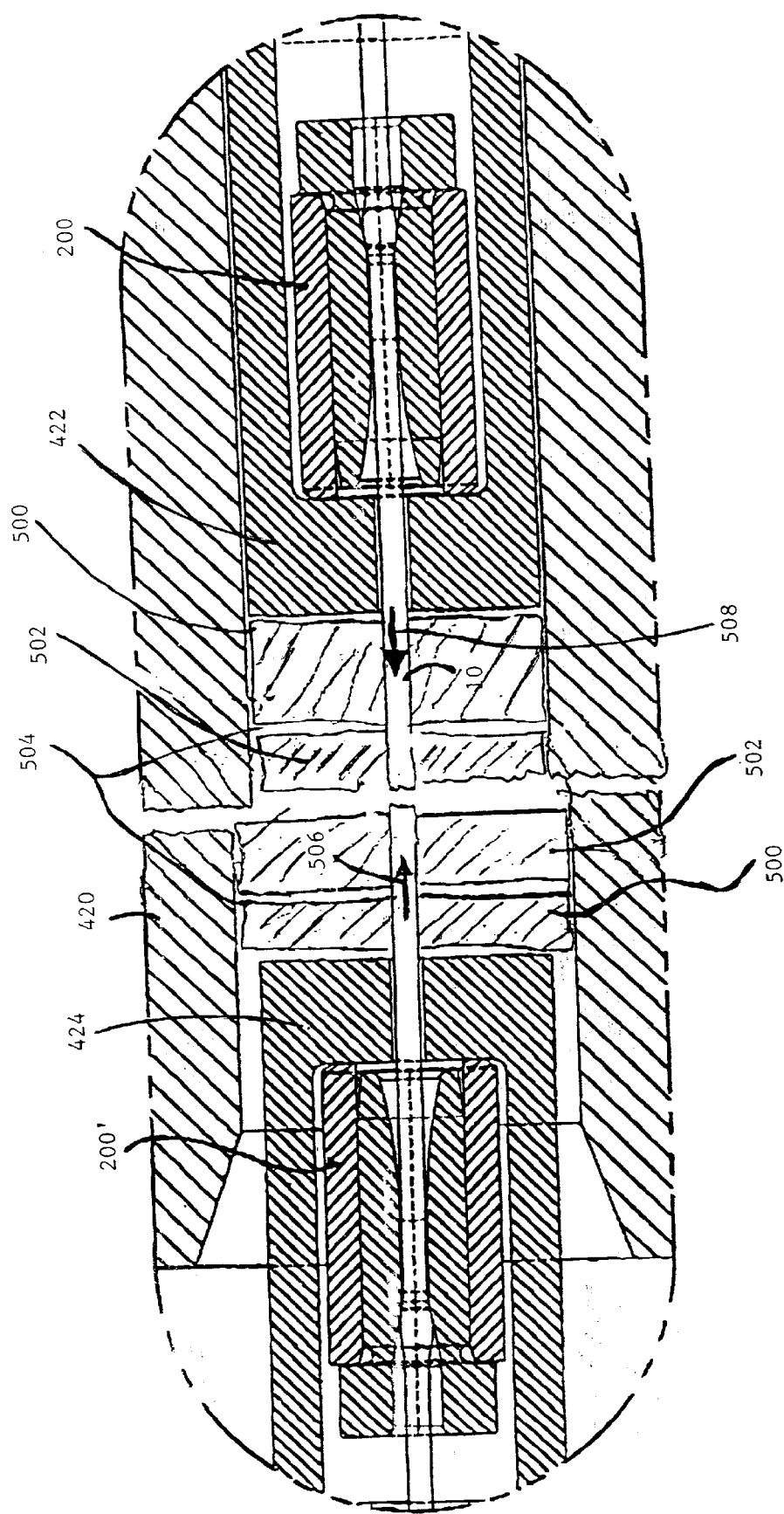
FIG. 21 is a blown-up cross-section of the bellows structure and the tubes, according to another embodiment of the present invention.

It is known in the prior art to induce a compression force on an optical fiber to provide a broader range of sensing and/or tuning, as disclosed in U.S. Pat. No. 5,469,520 to Morey. The present invention further includes an embodiment for implementing a pressure sensor where the pressure places the fiber in compression, as shown in FIG. 21. As shown in FIG. 21, ferrules 500, 502 are provided within the housing 420 between the gap between the straight tubes 422 and 424 to prevent the fiber 10 from buckling when a compression force in the direction of arrows 506, 508 is applied to the fiber 10. The housing 420 is coupled to any of the sensor configurations described hereinabove, such as that shown in FIG. 21, or any other sensor capable of transmitting a compression force on the fiber 10, in response to a positive pressure fluctuation. Pressure fluctuations produce a wavelength shift in the Bragg grating 180, as described hereinabove, indicative of the pressure being sensed. The combination of the variation regions 16, 16' and the attachment mechanisms 200, 200' of the present invention solves the attachment and creep problems of the prior art. The ferrules 500, 502 are substantially free to slide along the housing 420. In contrast, the fiber 10 is secured within the housing 420 by the variation regions 16, 16' and the attachment mechanisms 200, 200' to prevent the fiber 10 from sliding or creeping during compression on the fiber 10 in the direction of arrows 506, 508. Preferably, a gap 504 is provided between the ferrule 500 and 502 sufficient to allow compression of the fiber 10.

The grating may be used in transmission and/or reflection, as is known. When two or more gratings are used for pressure sensing, the gratings may have the same reflection wavelengths and/or profiles or different wavelengths and/or profiles. The multiple gratings may be used individually in a known Fabry Perot arrangement. Further, one or more fiber lasers, such as that described in U.S. Pat. No. 5,513,913, entitled "Active Multipoint Fiber Laser Sensor", U.S. Pat. No. 5,564,832, entitled "Birefringent Active Fiber Laser Sensor", or U.S. Pat. No. 5,666,372, "Compression Tuned Fiber Laser", may be embedded within the fiber 10 for pressure sensing, which are incorporated herein by reference to the extent necessary to understand the present invention. In that case, the gratings form an optical cavity and the fiber 10 at least between the gratings (and may also include the gratings and/or the fiber 10 outside the gratings, if desired) would be doped with a rare earth dopant, e.g. erbium and/or ytterbium, etc., and the lasing wavelength would shift as pressure changes.

Furthermore, another type of tunable fiber laser that may be used is a tunable distributed feedback (DFB) fiber laser, such as that described in V. C. Lauridsen, et al, "Design of DFB Fibre Lasers", Electronic Letters, Oct. 15, 1998, Vol.34, No.21, pp2028–2030; P. Varming et al, "Erbium Doped Fiber DFB Laser With Permanent $\pi/2$ Phase-Shift Induced by UV Post-Processing", IOOC'95, Tech. Digest, Vol.5, PD1–3, 1995; U.S. Pat. No. 5,771,251, "Optical Fibre Distributed Feedback Laser", to Kringlebotn et al; or U.S. Pat. No. 5,511,083, "Polarized Fiber Laser Source", to D'Amato et al. In that case, the grating is written in a rare-earth doped fiber and configured to have a phase shift of $\lambda/2$ (where $\lambda$ is the lasing wavelength) at a predetermined location near the center of the grating, which provides a well defined resonance condition that may be continuously tuned in single longitudinal mode operation without mode hopping, as is known. Alternatively, instead of a single grating, the two gratings may be placed close enough to form a cavity having a length of $(N+\frac{1}{2})\lambda$, where N is an integer (including 0) and the gratings are in rare-earth doped fiber.

Alternatively, the DFB laser may be located on the fiber 10 between the pair of gratings 180 where the fiber 10 is doped with a rare-earth dopant along at least a portion of the distance between the gratings. Such configuration is referred to as an "interactive fiber laser", as set forth in U.S. Pat. No. 5,699,377 to J. J. Pan et al, entitled "Narrow Linewidth, Stabilized Semiconductor Laser Source", E-tek Dynamics, Inc., San Jose, Calif., internet website which is hereby incorporated by reference to the extent necessary to understand the present invention. Other single or multiple fiber laser configurations may be disposed on the fiber 10 if desired.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An optical pressure sensor comprising:
    an optical waveguide comprising a core and a cladding disposed outside the core, wherein the cladding has an outside diameter and includes a first and a second variation region each having a modified outside diameter different from the outside diameter, wherein the first and second variation regions are respectively located at a first mounting location and a second mounting location;
    a Bragg grating imparted in the waveguide between the first mounting location and the second mounting location which provides an optical sensor signal having a spectral profile centered at a characteristic wavelength;
    a first and second attachment mechanism disposed against at least one portion of the first variation region and the second variation region respectively which prevents relative movement between the first variation region and the first attachment mechanisms; and
    a mounting device having a first end which mounts to the first attachment mechanism and a second end which mounts to the second attachment mechanism which defines a separation length between the first and second attachment mechanisms along the waveguide and allowing the separation length to vary according to the pressure of the environment, thereby causing a change in the separation length and the characteristic wavelength.

2. The pressure sensor of claim 1, wherein
    the first attachment mechanism comprises:
        a first ferrule including a front portion having a profile substantially corresponding to the modified outside diameter of the first variation region of the cladding; and
        a first butting mechanism butting the first ferrule against the waveguide which presses the front portion of the first ferrule onto at least one portion of the first variation region at the first mounting location which limits relative movement between the first ferrule and the first variation region of the cladding, and
    the second attachment mechanism comprises:
        a second ferrule including a front portion having a profile substantially corresponding to the modified outside diameter of the second variation region of the cladding; and
        a second butting mechanism butting the second ferrule against the waveguide to press the front portion of the second ferrule onto at least one portion of the second variation region at the second mounting location which limits relative movement between the second ferrule and the second variation region of the cladding.

3. The pressure sensor of claim 2, wherein the first butting mechanism provides a pressing force against the front portion of the first ferrule along a first direction substantially parallel to the waveguide, and the second butting mechanism provides a pressing force against the front portion of the second ferrule along a second direction substantially opposite to the first direction.

4. The pressure sensor of claim 1, wherein the mounting device comprises a bellows structure which mounts to the first and second attachment mechanisms at the first and second ends of the mounting device.

5. The pressure sensor of claim 1, further comprising a temperature compensation means responsive to temperature of the environment which provides a temperature compensation optical signal.

6. The pressure sensor of claim 1, wherein the first and second attachment mechanisms have two collars, and each of said collars holds one of the attachment mechanisms against the waveguide.

7. The pressure sensor of claim 1, wherein the first and second variation regions include expanded regions in the cladding such that the modified outside diameter is greater than the outside diameter of the cladding.

8. The pressure sensor of claim 1, wherein the first and second variation regions include recessed regions in the cladding such that the modified outside diameter is smaller than the outside diameter of the cladding.

9. The pressure sensor of claim 2, further having a coating located between the cladding and the first and second ferrules which helps the ferrules to conform with the outside diameter of the respective variation regions to reduce point contact stresses on the waveguide.

10. The pressure sensor of claim 1, wherein the first and second attachment mechanisms overhangs at least one portion of the respective variation regions.

11. The pressure sensor of claim 1, wherein the waveguide further comprises a buffer layer over the cladding which protects the waveguide against the first and second attachment mechanisms and which enhances the attachment of the first and second attachment mechanisms to the waveguide.

12. The pressure sensor of claim 11, wherein the first and second attachment mechanisms are bonded to the buffer layer.

13. The pressure sensor of claim 11, wherein the buffer layer comprises a metal layer.

14. The pressure sensor of claim 13, wherein the metal layer comprises Ni and Au.

15. The pressure sensor of claim 11, wherein the buffer layer comprises a polymer layer.

16. The pressure sensor of claim 2, wherein the first and second ferrules comprise a plurality of pieces substantially surrounding the respective variation regions which attach to the cladding.

17. The pressure sensor of claim 1, wherein the modified outside diameter causes minimal deformation to the core which minimizes optical loss from the core due to the modified outside diameter.

18. The pressure sensor of claim 1, wherein the core of the waveguide is axially continuous near the first and second variation regions.

19. The pressure sensor of claim 1, further comprising a further waveguide segment including a cladding having a second outside diameter substantially equal to the modified outside diameter which splices with the waveguide and provides each of the first and second variation regions.

20. The pressure sensor of claim 1 wherein said change in the separation distance causes a change in tensile strain on the grating.

21. The pressure sensor of claim 1, wherein said change in the separation distance causes a change in compressive strain on the grating.

22. The pressure sensor of claim 1, wherein the modified outside diameter is provided by fusing a tube to the cladding.

23. The pressure sensor of claim 1, wherein the modified outside diameter is provided by heating and stretching the waveguide which changes the outside diameter of the cladding.

24. The pressure sensor of claim 1, wherein the modified outside diameter is provided by etching the outside diameter of the cladding.

25. A method of sensing pressure in an environment comprising:
   providing an optical waveguide, wherein the waveguide comprises a core and a cladding disposed outside the core, wherein the cladding has an outside diameter and includes a first and a second variation region each having a modified outside diameter different from the outside diameter, and wherein the first and second variation regions are respectively located at a first mounting location and a second mounting location;
   providing a grating imparted in the core of the waveguide between the first mounting location and the second mounting location which provides an optical sensor signal having a spectral profile centered at a characteristic wavelength;
   providing a first and second attachment mechanism disposed against at least one portion of the first variation region and second variation region respectively, which prevents relative movement between the first variation regions and the attachment mechanisms; and
   providing a mounting device having a first end, which mounts to the first attachment mechanism and a second end, which mounts to the second attachment mechanism, which defines a separation length between the first and second attachment mechanisms along the waveguide and allowing the separation length to vary according to the pressure of the environment, thereby causing a change in the separation distance and the spacing of the grating.

26. The method of claim 25, wherein
   the first attachment mechanism comprises:
     a first ferrule including a front portion having a profile substantially corresponding to the modified outside diameter of the first variation region of the cladding; and
     a first butting mechanism butting the first ferrule against the waveguide for pressing the front portion of the first ferrule onto at least one portion of the first variation region at the first mounting location which limits relative movement between the first ferrule and the first variation region of the cladding, and
   the second attachment mechanism comprises:
     a second ferrule including a front portion having a profile substantially corresponding to the modified outside diameter of the second variation region of the cladding; and
     a second butting mechanism butting the second ferrule against the waveguide which presses the front portion of the second ferrule onto at least one portion of the second variation region at the second mounting location which limits relative movement between the second ferrule and the second variation region of the cladding.

27. The method of claim 26, wherein the first butting mechanism provides a pressing force against the front portion of the first ferrule along a first direction substantially parallel to the waveguide, and the second butting mechanism provides a pressing force against the front portion of the second ferrule along a second direction substantially opposite to the first direction.

28. The method of claim 25, wherein the mounting device comprises a multi-element bellows structure which mounts the first and second attachment mechanisms at the first and second ends of the mounting device.

29. The method of claim 25, further comprising the step of providing a temperature compensation means responsive to temperature of the environment which provides a temperature compensation optical signal.

30. The method of claim 25, further comprising the step of providing collars to hold the first and second attachment mechanisms against the waveguide.

31. The method of claim 25, wherein the first and second variation regions include expanded regions in the cladding such that the modified outside diameter is greater than the outside diameter of the cladding.

32. The method of claim 25, wherein the first and second variation regions include recessed regions in the cladding such that the modified outside diameter is smaller than the outside diameter of the cladding.

33. The method of claim 26, further comprising the step of providing a coating between the cladding and the first and second ferrules which helps the ferrules to conform with the outside diameter of the respective variation regions and reduces point contact stresses on the waveguide.

34. The method of claim 25, further comprising the step of providing a buffer layer over the cladding to protect the waveguide against the first and second attachment mechanisms and for enhancing attachment of the first and second attachment mechanisms to the waveguide.

35. The method of claim 34, further comprising the step of bonding the buffer layer to the first and second attachment mechanisms.

36. The method of claim 25, wherein the first and second ferrules comprise a plurality of pieces substantially surrounding the respective variation regions to attach to the cladding at each mounting location.

37. The method of claim 25, further comprising the step of splicing a further waveguide segment including a cladding having a second outside diameter substantially equal to the modified outside diameter with the waveguide to form each of the first and second variation regions.

38. The method of claim 25, further comprising the step of fusing a tube to the cladding to form the modified outside diameter of the first and second variation regions.

39. The method of claim 25, further comprising the step of heating and stretching the waveguide to form the modified outside diameter of the first and second variation regions.

40. The method of claim 25, further comprising the step of etching the outside diameter of the cladding to form the modified outside diameter of the first and second variation regions.

41. A distributed pressure sensing system for sensing pressure at a plurality of locations in an environment, comprising:
a light source which provides an optical signal;
an optical waveguide, wherein the waveguide includes a core and a cladding disposed outside the core and the core has an outside diameter and includes a plurality of sensing sections, each having a grating imparted therein, and each grating has a plurality of perturbations defined by a spacing, which provides an optical sensor signal; and wherein the cladding in each sensing section has a first and a second variation region each having a modified outside diameter different from the outside diameter; and
a plurality of pressure sensitive structures, each mounted at one sensing section, each pressure sensitive structure comprising:
a first and second attachment mechanism disposed against at least one portion of the first variation region and second variation region respectively to prevent relative movement between the variation regions and the attachment mechanisms; and
a mounting device having a first end which mounts to the first attachment mechanism and a second end which mounts to the second attachment mechanism to define a separation length between the first and second attachment mechanisms along the waveguide and allowing the separation length to vary according to the pressure of the environment, thereby causing a change in the spacing of the grating.

42. The distributed pressure sensing system of claim 41, wherein
the first attachment mechanism comprises:
a first ferrule including a front portion having a profile substantially corresponding to the modified outside diameter of the first variation region of the cladding; and
a first butting mechanism butting the first ferrule against the waveguide to press the front portion of the first ferrule onto at least one portion of the first variation region at the first mounting location to limit relative movement between the first ferrule and the first variation region of the cladding, and
the second attachment mechanism comprises:
a second ferrule including a front portion having a profile substantially corresponding to the modified outside diameter of the second variation region of the cladding; and
a second butting mechanism butting the second ferrule against the waveguide to press the front portion of the second ferrule onto at least one portion of the second variation region at the second mounting location which limits relative movement between the second ferrule and the second variation region of the cladding.

43. The distributed pressure sensing system of claim 41, wherein the mounting device comprises a multi-element bellows structure to mount the first and second attachment mechanisms at the first and second ends of the mounting device.

44. The distributed pressure sensing system of claim 41, wherein each of the pressure sensitive structures further comprises a temperature compensation means responsive to temperature of the environment for providing a temperature compensation optical signal.

45. The distributed pressure sensing system of claim 42, wherein the first and second variation regions include expanded regions in the cladding such that the modified outside diameter is greater than the outside diameter of the cladding.

46. The distributed pressure sensing system of claim 42, wherein the first and second variation regions include recessed regions in the cladding such that the modified outside diameter is smaller than the outside diameter of the cladding.

47. The distributed pressure sensing system of claim 42, wherein the first and second ferrules each comprises a plurality of pieces substantially surrounding the respective variation region for attaching to the cladding.

48. The distributed pressure sensing system of claim 41, further comprising spectral filters to separate the sensor signal from one grating from the sensor signal from another grating.

49. An optical pressure sensor, comprising:
an optical optical wave guide, comprising:
a core; and
a cladding disposed outside of the core, the cladding having a first variation and a second variation of an outside dimension thereof, wherein the first and second variations are axially spaced a distance along the length of the optical wave guide;
a structure disposed against at least a portion of the first variation and the second variation which minimizes relative movement in at least one axial direction between the optical wave guide and the structure, wherein the optical wave guide is held in tension against the structure and extends axially from opposite axial ends of the structure; and
an optical sensor portion that provides an optical signal indicative of a change in the distance between the first and second variations, the change in distance caused by a pressure variation.

50. The optical pressure sensor of claim 49, wherein the optical sensor portion comprises a Bragg grating.

51. The optical pressure sensor of claim 49 wherein the structure comprises a bellows.

52. The optical pressure sensor of claim 49, wherein the variations comprise an expanded region.

53. The optical pressure sensor of claim 49, wherein the variations comprise a recessed region 54. The optical pressure sensor of claim 49, wherein the structure comprises a ferrule.

55. The optical pressure sensor of claim 54, further comprising a housing adjacent to the ferrule.

56. The optical pressure sensor of claim 49, wherein the structure comprises an inner coating adjacent to the optical wave guide.

57. The optical pressure sensor of claim 49, wherein the structure is bonded to the cladding.

58. The optical pressure sensor of claim 49, wherein the structure Comprises a geometry that substantially conforms to at least a portion of the variations.

59. The optical pressure sensor of claim 49, wherein the structure overlaps at least a portion of the variations.

60. The optical pressure sensor of claim 49, wherein the structure overhangs at least a portion of the variations.

61. The optical pressure sensor of claim 49, wherein the optical wave guide further comprises a buffer layer between the structure and the cladding.

62. The optical pressure sensor of claim 61, wherein the structure is bonded to the buffer layer.

63. The optical pressure sensor of claim 61, wherein the buffer layer comprises a polymer layer.

64. The optical pressure sensor of claim 61, wherein the buffer layer Comprises a metal layer.

65. The optical pressure sensor of claim 63, wherein the metal layer comprises Ni and Au.

66. The optical pressure sensor of claim 49, wherein the variations comprise a bulge.

67. The optical pressure sensor of claim 49, wherein the structure comprises more than one piece.

68. The optical pressure sensor of claim 49, wherein the structure comprises a collar which holds the structure against the optical wave guide.

69. The optical pressure sensor of claim 49, wherein the structure is detachably disposed against the variations.

70. A method of attaching an optical optical wave guide to art optical pressure Sensor, comprising:
providing an optical optical wave guide having a core arid a cladding disposed outside of the core, the optical wave guide having a first variation and a second variation of an outside dimension of the cladding, wherein the first and second variations are axially spaced a distance along the length of the optical wave guide;
placing a structure of the optical pressure sensor against at least a portion of the variations so as to minimize relative movement in at least one axial direction between the optical wave guide and the structure, wherein the optical wave guide is held in tension against the structure and extends axially from opposite axial ends of the structure; and
locating art optical sensor portion along the optical pressure sensor, the optical sensor portion provides an optical signal indicative of a change in the distance between the first and second variations caused by a pressure variation.

71. The method of claim 70, wherein the optical sensor portion is a Bragg grating disposed along the optical wave guide between the first and the second variations.

72. The method of claim 70, wherein the structure is a bellows.

73. The method of claim 70, wherein the optical wave guide further comprises an outer buffer layer between the structure and the cladding.

74. The method of claim 70, wherein the structure comprises a ferrule.

75. The method of claim 70, wherein the structure comprises more than one piece.

76. The method of claim 70, wherein the structure comprises a collar which holds the structure against the optical wave guide.

77. The method of claim 76, wherein the collar comprises a heat shrinking material.

78. The method of claim 70, wherein the structure comprises a housing

79. The method of claim 70, wherein the placing comprises crimping the structure around at least a portion of the variation.

80. The method of claim 70, wherein the placing comprises heating the structure and applying pressure to the structure to force the structure to conform to the variation.

81. The method of claim 70, wherein the placing comprises heating the structure and pulling the optical wave guide to force the structure to conform to the variation.

82. The method of claim 70, wherein the variation comprises a bulge.

83. The method of claim 70, wherein the structure is detachably disposed against the variation.

84. A pressure sensing system, comprising:
a light source that provides an input optical signal;
a optical wave guide having a core and a cladding disposed outside of the core of the optical wave guide;
at least one optical pressure sensor, comprising:
a first variation and a second variation of an outside dimension of the cladding, wherein the first and second variations are axially spaced a distance along the length of the optical wave guide;
a structure against at least a portion of the variations so as to minimize relative movement in at feast one axial direction between the optical wave guide and the structure, wherein the optical wave guide is held in tension against the structure and extends axially from opposite axial ends of the structure; and an optical sensor portion, the optical sensor portion provides an output optical signal indicative of a change in the distance between the first and second variations;

an optical signal processing unit that detects the output optical signal from the at least one optical pressure sensor to determine a pressure variation at the at least one optical pressure sensor.

85. The pressure sensing system of claim 84, wherein the optical senor portion comprises a Bragg grating.

86. The pressure sensing system of claim 84, wherein the structure comprises a bellows.

87. The pressure sensing system of claim 84, wherein the at least one optical pressure sensors comprises at least two optical pressure sensors.

88. The pressure sensing system of claim 84, wherein the optical sensor portion is a tunable distributed feedback optical wave guide laser.

89. An optical pressure sensor, comprising:
- an optical wave guide, comprising:
    - a core; and
    - a cladding disposed outside of the core, the cladding having a variation of an outside dimension thereof;
- a structure disposed against at least a portion of the variation which minimizes relative movement in at least one axial direction between the optical wave guide and the structure, wherein the optical wave guide is held in tension against the structure and extends axially from opposite axial ends of the structure; and
- an optical sensor portion that provides an optical signal indicative of a change in the distance between the variation and a portion of the optical wave guide, the change in distance caused by ba pressure variation.

* * * * *